United States Patent Office 3,315,886
Patented Apr. 25, 1967

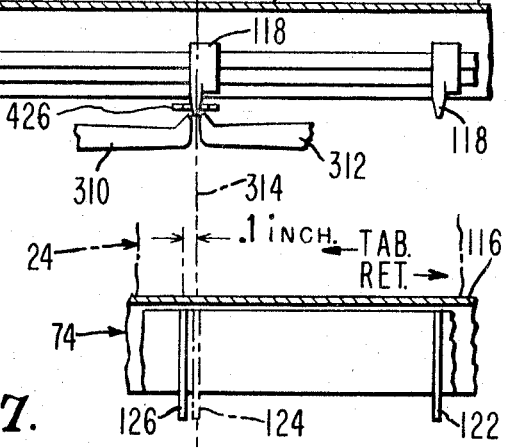
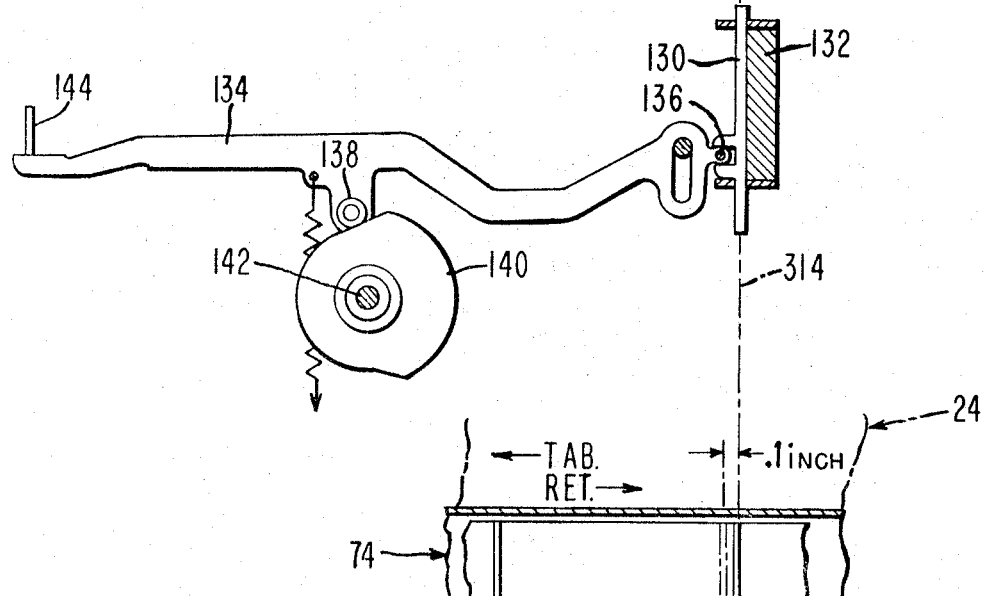
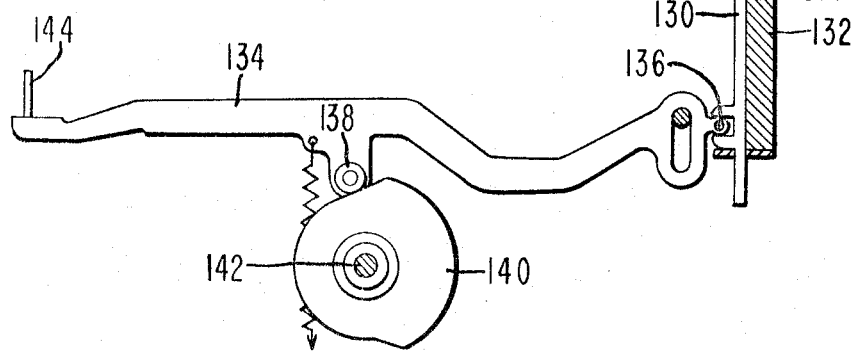

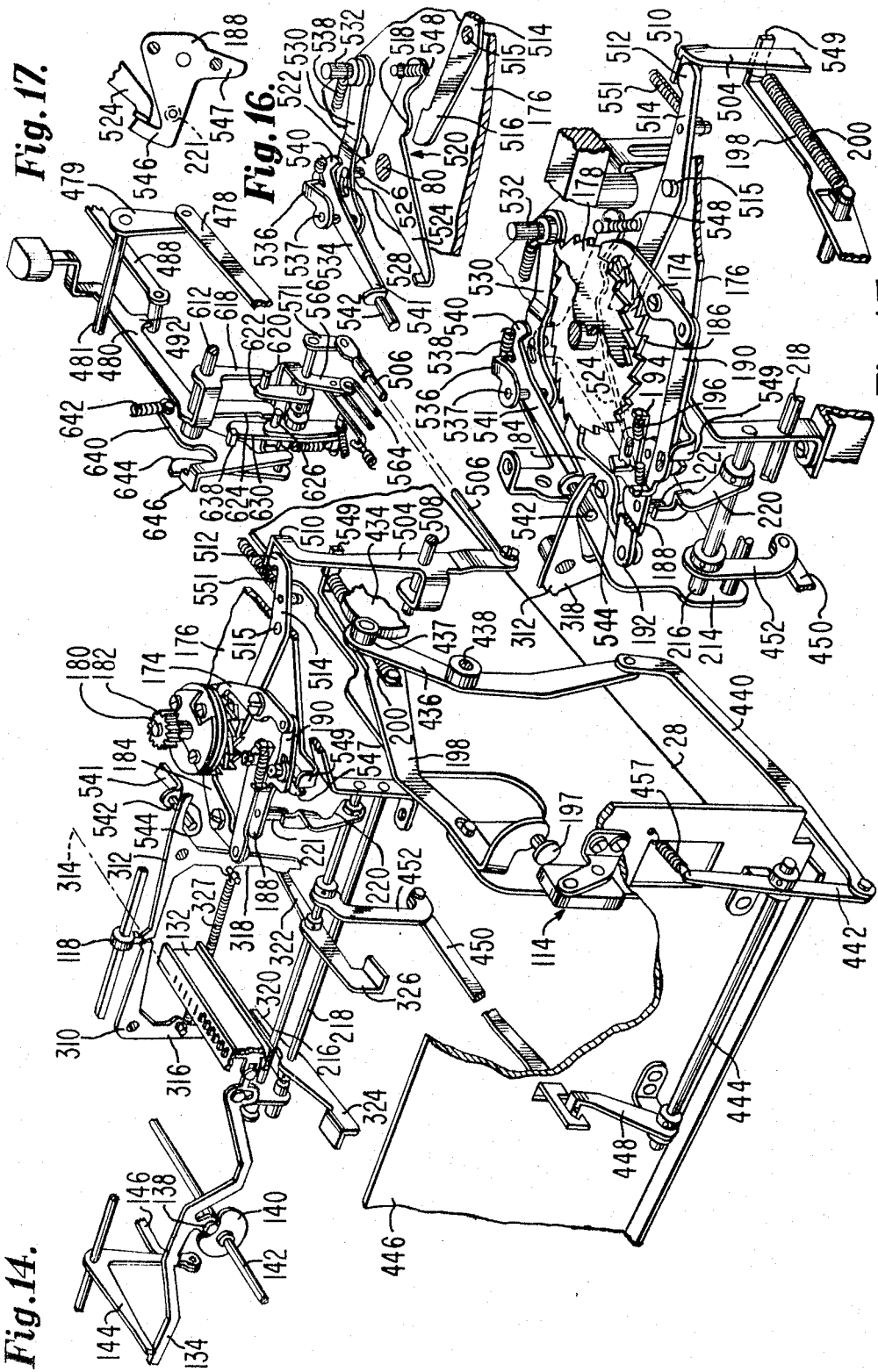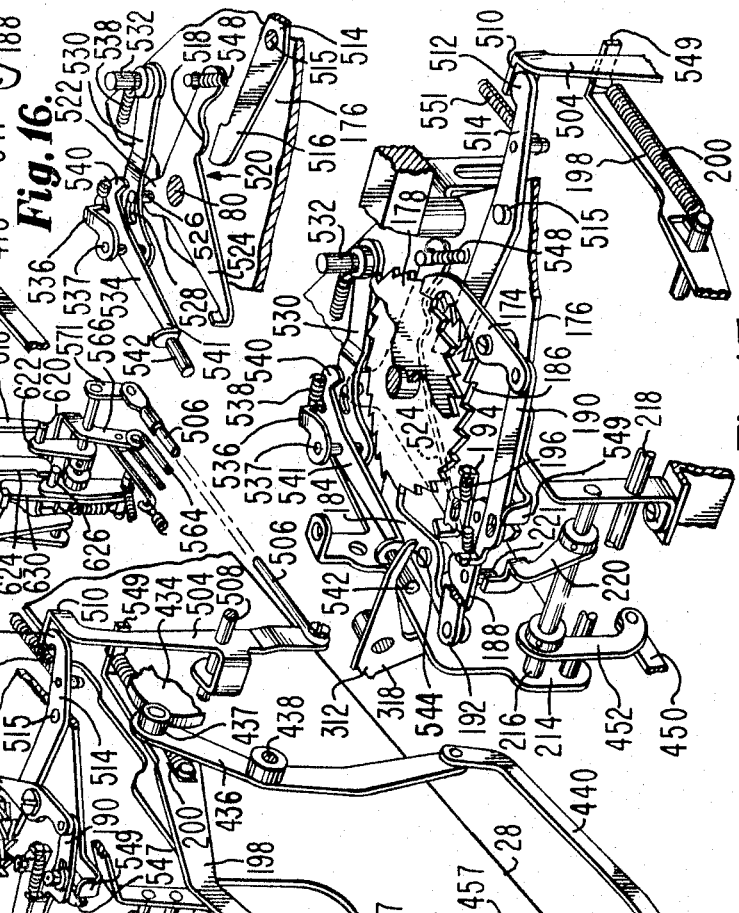

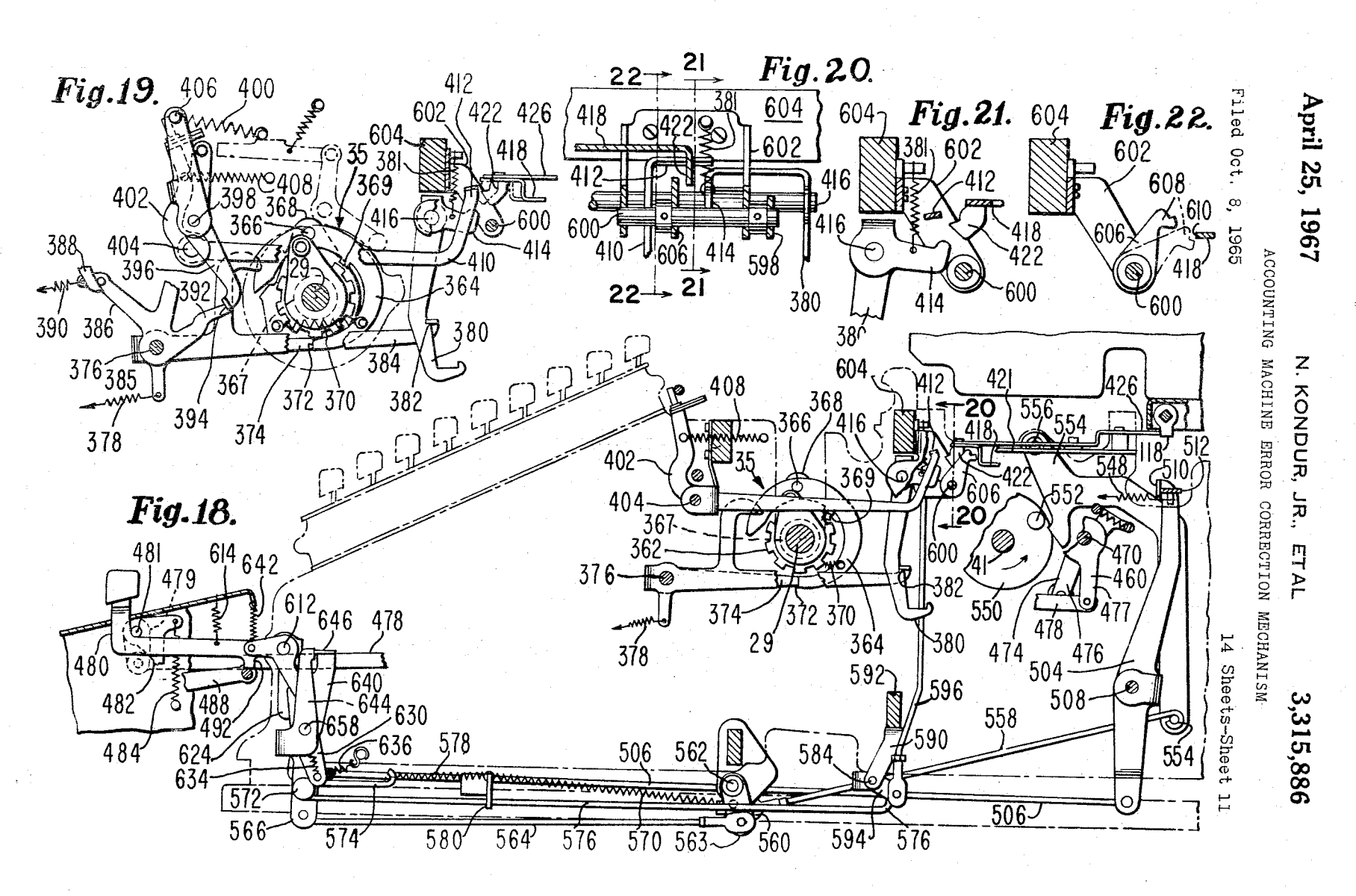

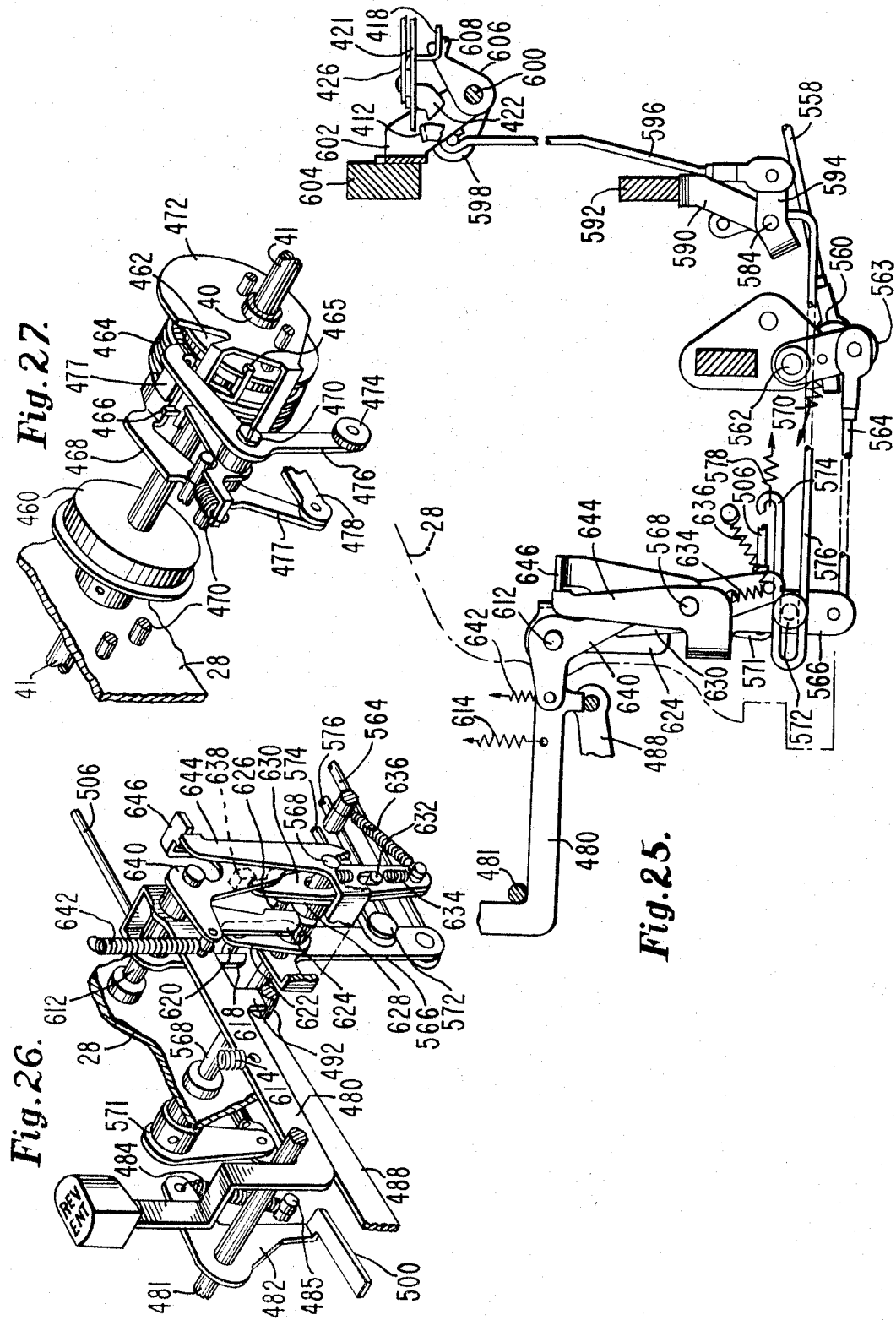

3,315,886
ACCOUNTING MACHINE ERROR CORRECTION MECHANISM
Nicholas Kondur, Jr., Northville, and Ronald H. Mack, Plymouth, Mich., assignors to Burroughs Corporation, Detroit, Mich., a corporation of Michigan
Filed Oct. 8, 1965, Ser. No. 494,174
4 Claims. (Cl. 235—60.47)

This invention relates generally to cyclically operable accounting machines and particularly to automatic arithmetical function selecting mechanism therefor.

It is an object of the present invention to provide in a cyclically operable accounting machine, an improved arithmetical function selecting mechanism embodying reverse entry selection to effect correction of an erroneous amount entered in an amount accumulator.

Another object of the invention is to provide for a cyclically operable accounting machine having a platen carriage and a machine function program mounted thereon, an improved arithmetical function selecting mechanism operable to select an arithmetical function and/or its opposite function merely by effecting the shifting of the carriage to positions corresponding to said functions.

Another object of the invention is to provide an improved arithmetical function selecting mechanism in which certain programmed arithmetical functions are selectable by the positioning of the program carriage in corresponding columnar positions, and the reverse of such programmed functions are selectable by the shifting of the carriage to locations between the columnar positions.

Another object of the invention resides in the moving of the carriage, at the will of the operator, to a programmed position for effecting a reverse entry operation and to provide for automatic return of the carriage to the columnar entry position previously occupied, upon and in response to a completion of the reverse entry operation.

A further object of the invention is to provide for a cyclically operable accounting machine of the type which is conditioned for operation by the presence of a function selecting element at a columnar position of a program carriage, a mechanism for automatically conditioning operation of the machine on shifting of the carriage a distance less than columnar spacing to present a reverse entry function selecting element to effective position.

More specifically it is an object of the invention to provide for a cyclically operable accounting machine in which a machine operation inhibitor automatically becomes effective to prevent cycling of the machine upon movement of a carriage mounted program from a columnar position, and to provide for movement of the carriage program from a columnar position to a reverse entry position and at the same time maintain said inhibitor effective.

Other objects of the invention will become apparent from the following description, taken in connection with the accompanying drawings in which:

FIG. 6 is a vertical sectional view, taken along the line 6—6 of FIG. 2;

FIG. 7 is another vertical sectional view, taken along the line 7—7 of FIG. 2;

FIG. 8 is a view similar to FIG. 7 showing the operating parts in other positions;

FIG. 14 is a perspective view showing certain of the machine mechanisms as seen from the rear leftward side of the machine;

FIG. 15 is a perspective view of an indexing mechanism;

FIG. 16 is a perspective view of details of the indexing mechanism of FIG. 15;

FIG. 17 is a detail view of mechanism shown in FIG. 15;

FIG. 18 is a vertical sectional view, taken substantially along the line 18—18 of FIG. 3;

FIG. 19 is an enlarged view, partly in section of a clutch mechanism of FIG. 18;

FIG. 20 is a vertical sectional view, taken along the line 20—20 of FIG. 18;

FIG. 21 is a vertical sectional view, taken along the 21—21 of FIG. 20;

FIG. 22 is another vertical sectional view, taken along the line 22—22 of FIG. 20;

FIG. 25 is a view similar to FIG. 24, illustrating the return of certain parts of the mechanism to normal positions;

FIG. 26 is a perspective view of the reverse entry key and associated mechanism, and FIG. 27 is a perspective view of a clutch.

Figure 1:
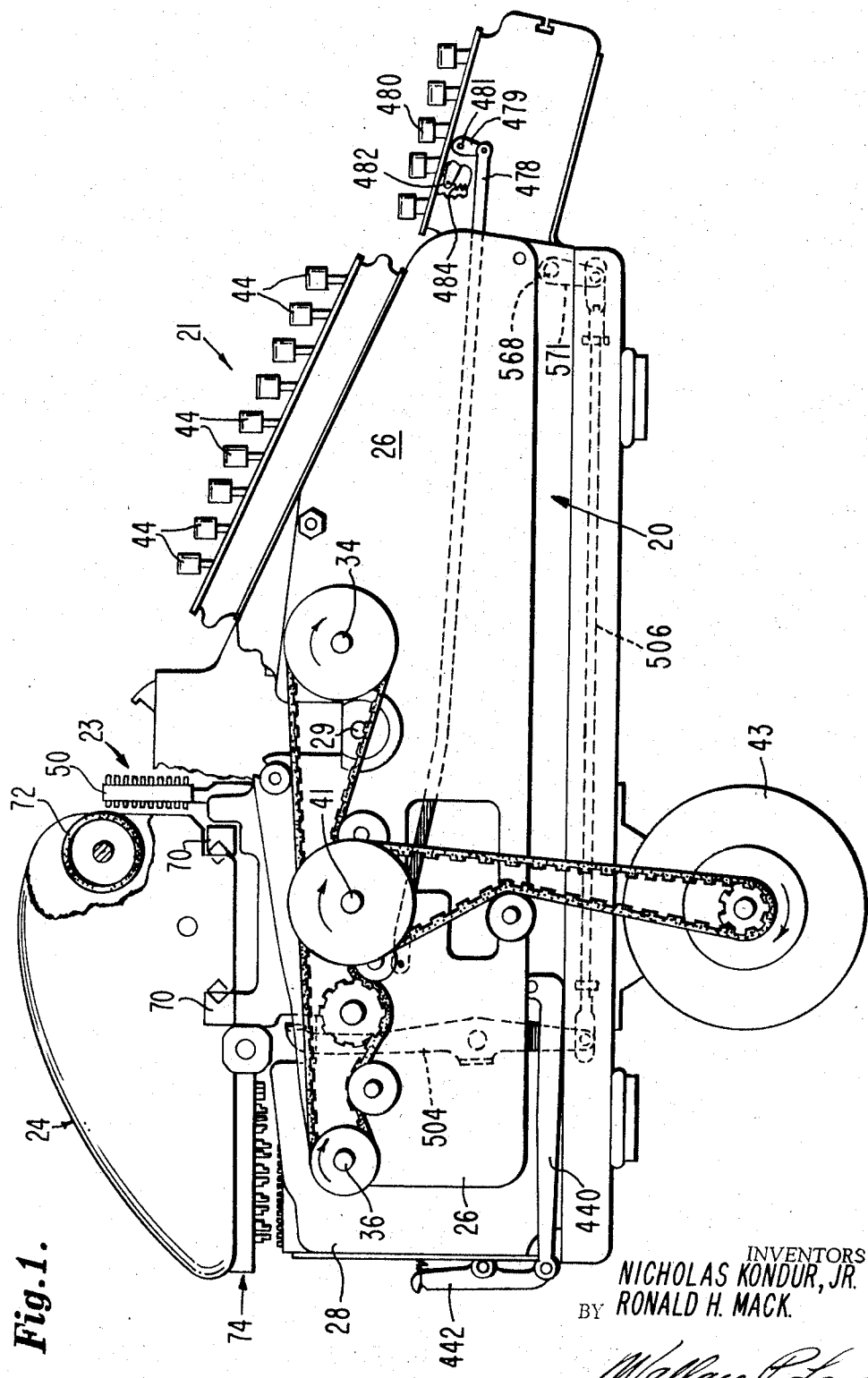
FIG. 1 is a side view of an accounting machine embodying features of the invention.

As the present invention relates to improvements in arithmetical function selecting mechanism for accounting machines, the machine herein referred to has not been described in its entirety, but for a complete understanding of such machines, reference may be had to the patents to Thomas M. Butler, No. 2,629,549, and Robert R. Henderson, No. 3,035,677.

Referring to the drawings by characters of reference, the accounting machine comprises, in general, a supporting structure or frame 20, a keyboard 21, one or more amount accumulators 22, printing mechanism 23, and a platen carriage 24. The keyboard 21, accumulators 22, printing mechanism 23 and the carriage 24 are mounted on the frame 20 in the well known arrangement, the printing mechanism being between the keyboard and the carriage and the accumulators being below the keyboard.

The machine frame 20 comprises the usual side frame members or plates 26 and 27 and an intermediate upright supporting plate 28, adjacent and in spaced parallel relation to the side plate 26. The plates 26, 27 and 28 may be rigidly connected together by well known cross rods (not shown).

Figure 3:
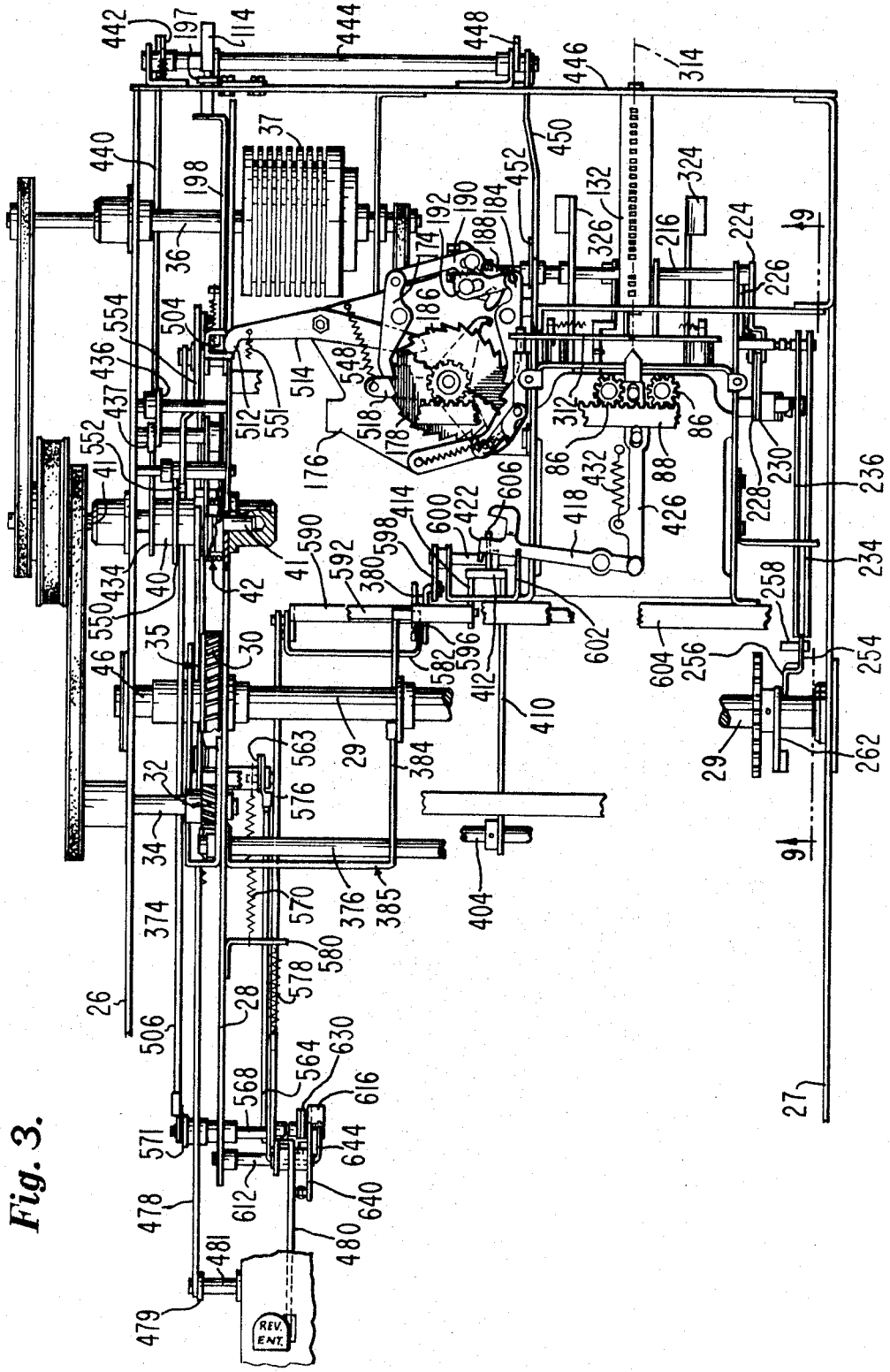
FIG. 3 is a plan view of mechanisms of the machine.
Figure 4:
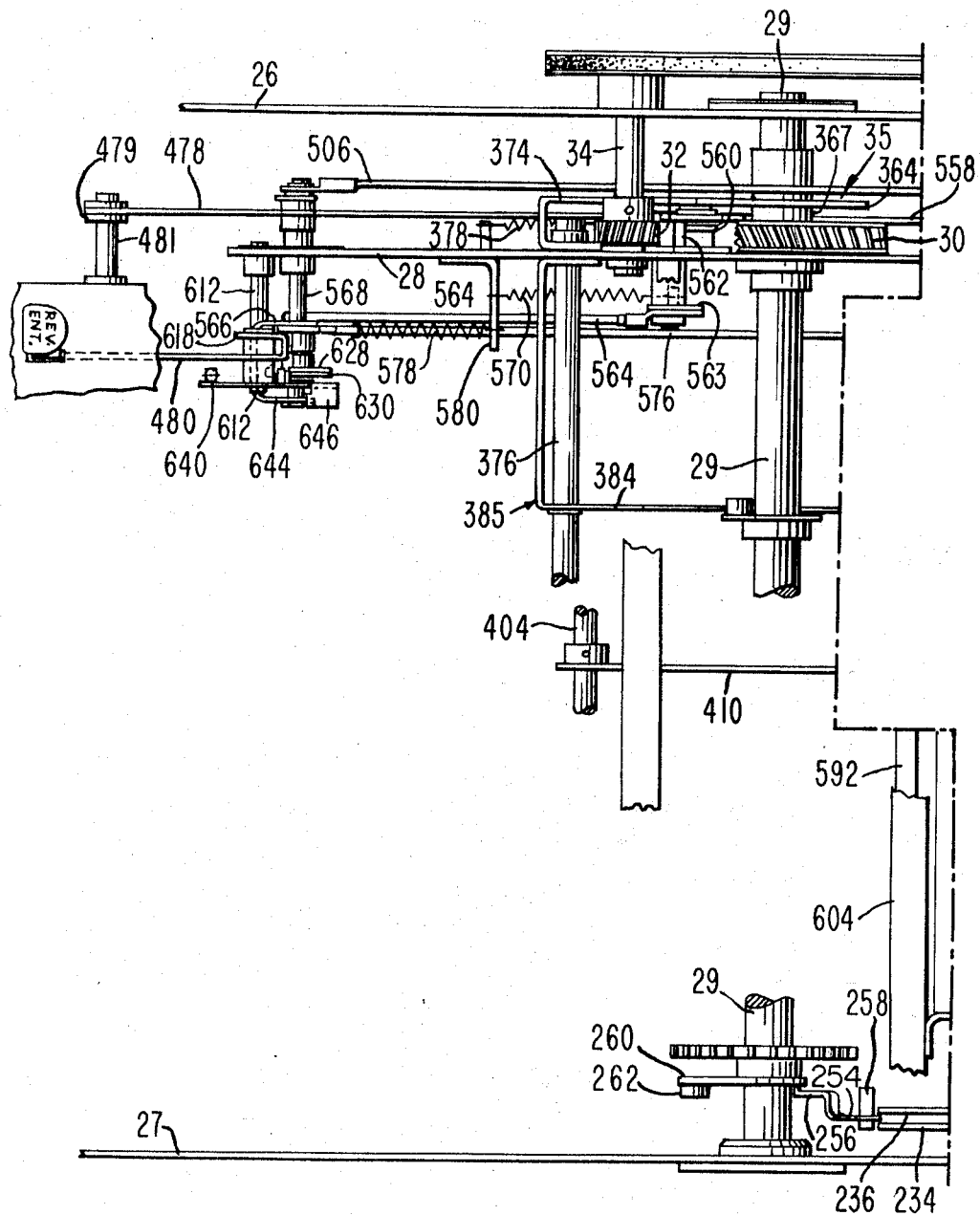
FIG. 4 is a plan view of an enlarged fragment of FIG. 3.

Suitably journaled on the frame plates 26, 27 and 28, FIGS. 3 and 4, there is a main crankshaft 29 which is connected by gears 30 and 32 to a parallel driving shaft 34, and gear 30 is connectable to the camshaft 29 by a normally disengaged one revolution clutch, designated generally by the numeral 35. As is well known, a cycle of operation of the main camshaft 29 effects operations of the machine components to select functions, enter amounts into the accumulators 22, operate the printer, etc. Rearwardly of the main camshaft 29 there is another driving shaft 36, journaled in the frame plate 26, and the shaft 36 is operatively connected preferably by a hysteresis clutch 37 to a transmission mechanism within a housing 38 for moving the carriage 24. Between the main camshaft 29 and the carriage driving shaft 36 there is another camshaft 40, journaled in the frame plates 26 and 28, the camshaft 40 being connectable to a driving shaft 41 by a normally disengaged, one revolution clutch, designated generally by the numeral 42. As will be hereinafter more fully understood, the clutch 42 may be engaged, at the will of the machine operator, to effect a digit or letter space movement of the carriage 24 preparatory to the removing of an erroneous amount from the accumulators 22. An electric motor 43 drives the shafts 34, 36 and 41 through suitable means such as the belt driven pulley drive shown in FIG. 1.

Figure 2:
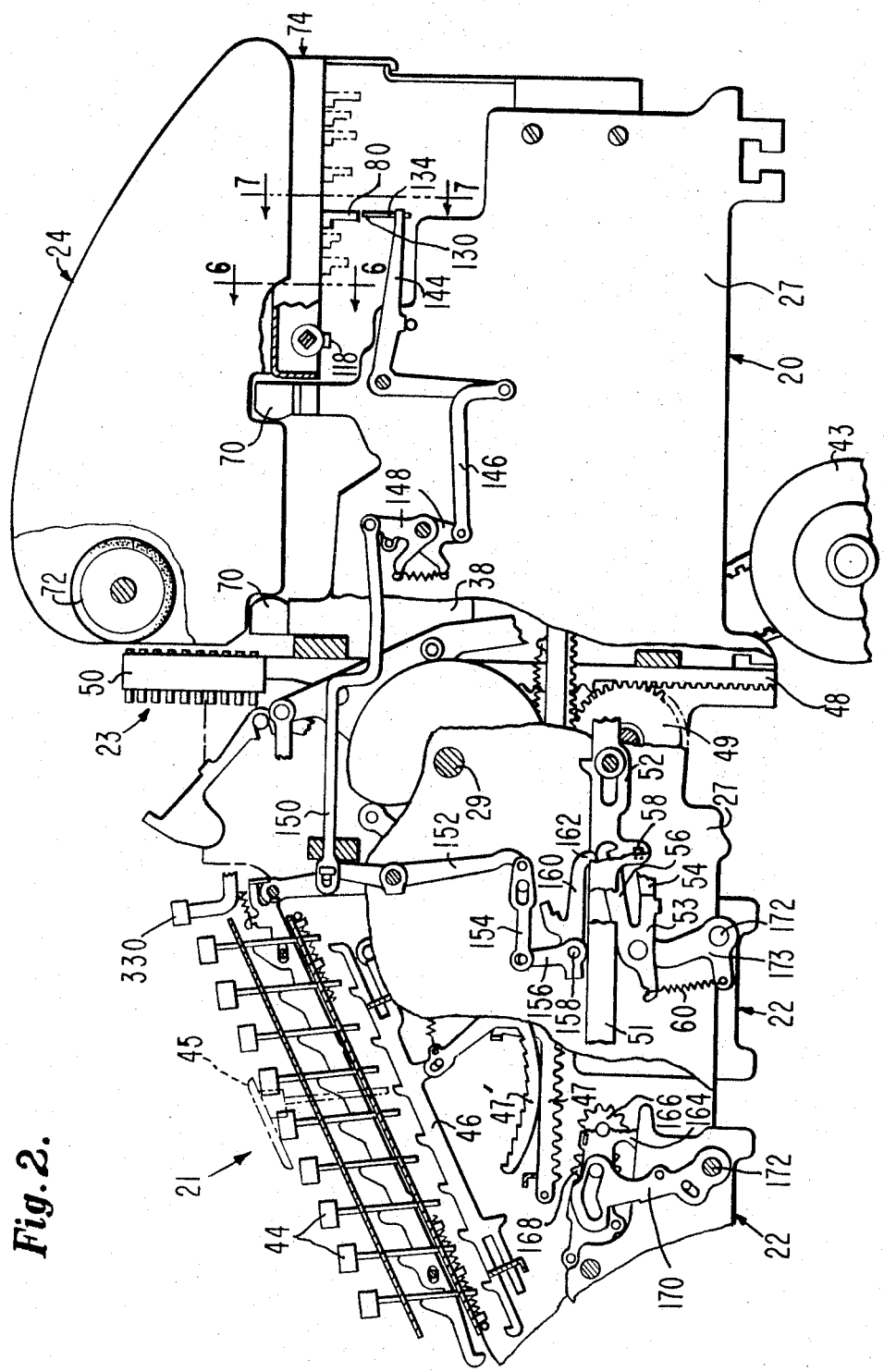
FIG. 2 is a view of the other side of the machine with parts broken away and in section.

The keyboard 21 has the usual columnar rows of amount keys 44, of which only one row is shown, and has a conventional key 45 to activate the clutch 35 for initiating a cycle of operation of the main camshaft 29. Respectively located beneath the rows of amount keys 44 are parallel stop slides 46, as shown in FIG. 2, and beneath the stop slides are the well known differentially positionable amount racks 47 and stop sectors 47', there being a stop slide, stop sector and an amount rack for each row of amount keys. The amount racks 47 are connected respectively to vertical bars 48 by individually rotatable gears 49, the bars 48 carrying print heads 50 of the printing mechanism 23 which includes suitable print hammers.

The main camshaft 29 has a number of cams thereon (not shown) which, in relative timed relation, operate certain of the mechanisms of the machine including movement of the differentially positionable amount racks 47 to enter amounts in the accumulators 22. As is well known in such machines, when the key 45 is depressed, a cycle of operation of the camshaft 29 is initiated which includes movement, by the cams, of all of the racks 47 forwardly against limits, established by the stop slides 46, and then rearwardly to their starting positions. In the present machine, the rearward movement of the amount racks 47 is utilized to enter amounts additively in the amount accumulators 22, and the forward movement of the amount racks is utilized to enter amounts subtractively in the accumulators. To accomplish this, a pair of parallel slide members 51 and 52, operated from the main camshaft 29 are provided, the slide members 51 and 52 being add and subtract slide members respectively. The accumulator 22 has an arithmetical function control member or selector in the form of a lever 53 which is operable to connect one or the other of the slide members 51 and 52 operatively to the accumulators. As is well known from the aforementioned Butler patent, the timing of the cams of the main camshaft 29 is such that the subtract slide member 52 is moved rearwardly following which the amount racks 47 are moved forwardly and the add slide 51 is moved rearwardly after the amount racks are moved forwardly. The selector lever 53 is a bail type or bell crank lever, having a pair of offset arms 54 and 56 and each arm having a hooked end adapted to engage a stud 58 carried by each of the add and subtract slide members 51 and 52. Normally, the selector levers 53 are connected to the add slide member 51 such that add operation is the normal operation of the machine. A spring 60 urges the selector lever 53 to engage the stud 58 of the add slide member 51.

The carriage 24 is mounted for movement transversely of the machine frame on bearing race rails 70 which in turn are mounted on the machine frame. Carried by the carriage 24 there is a platen 72 and a function program device 74, the program device being suitably secured to the underside of the carrige.

Figure 11:
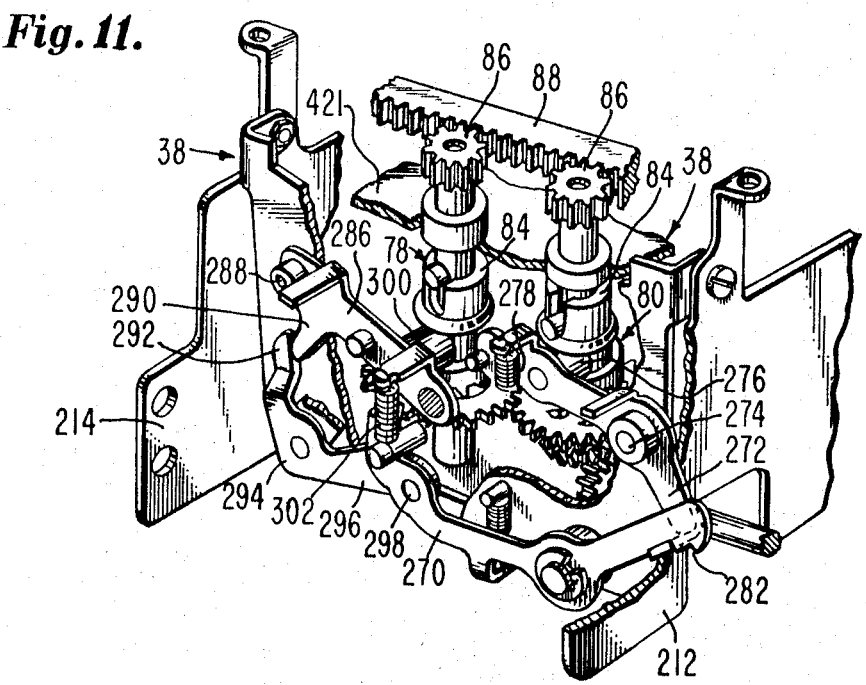
FIGS. 11 and 12 are perspective views of certain control mechanisms of the machine.
Figure 13:
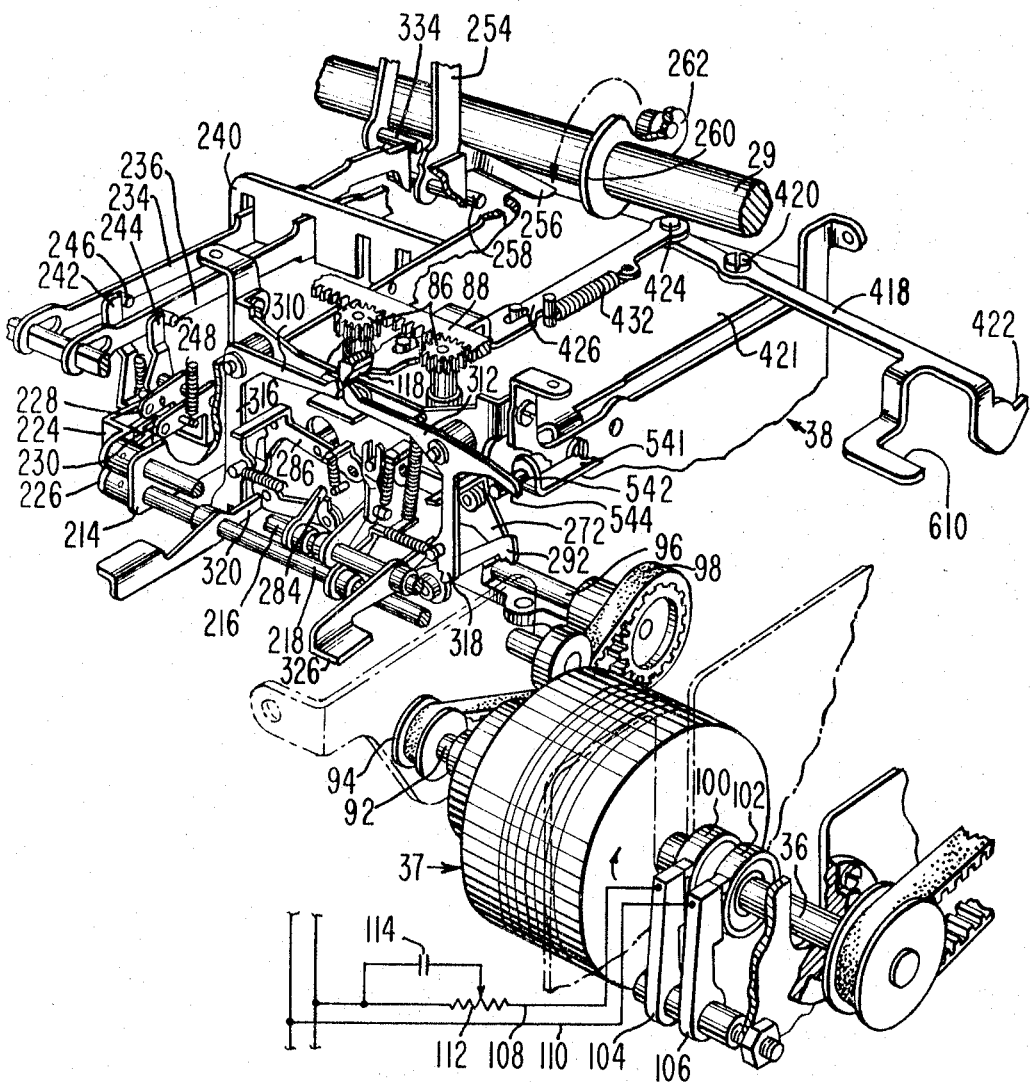
FIG. 13 is another perspective view of mechanisms of the machine.

The driving mechanism for the carriage 24 includes the motor driven hysteresis clutch 37, a carriage tabulation clutch 78, and a carriage return clutch 80 as shown in FIGS. 11 and 13. The clutches 78 and 80 have vertical driven shafts 84 which are journaled in the top and bottom walls of the transmission housing and to the upper ends of which gears 86 are secured and are in mesh with a gear rack 88, secured to the underside of the carriage 24. The upper clutch components are on the lower ends of vertically shiftable tubular shafts 84 to effect engagement and/or disengagement of the components. As shown in FIG. 11, tabulation clutch 78 is normally engaged and the return clutch 80 is normally disengaged.

Figure 5:
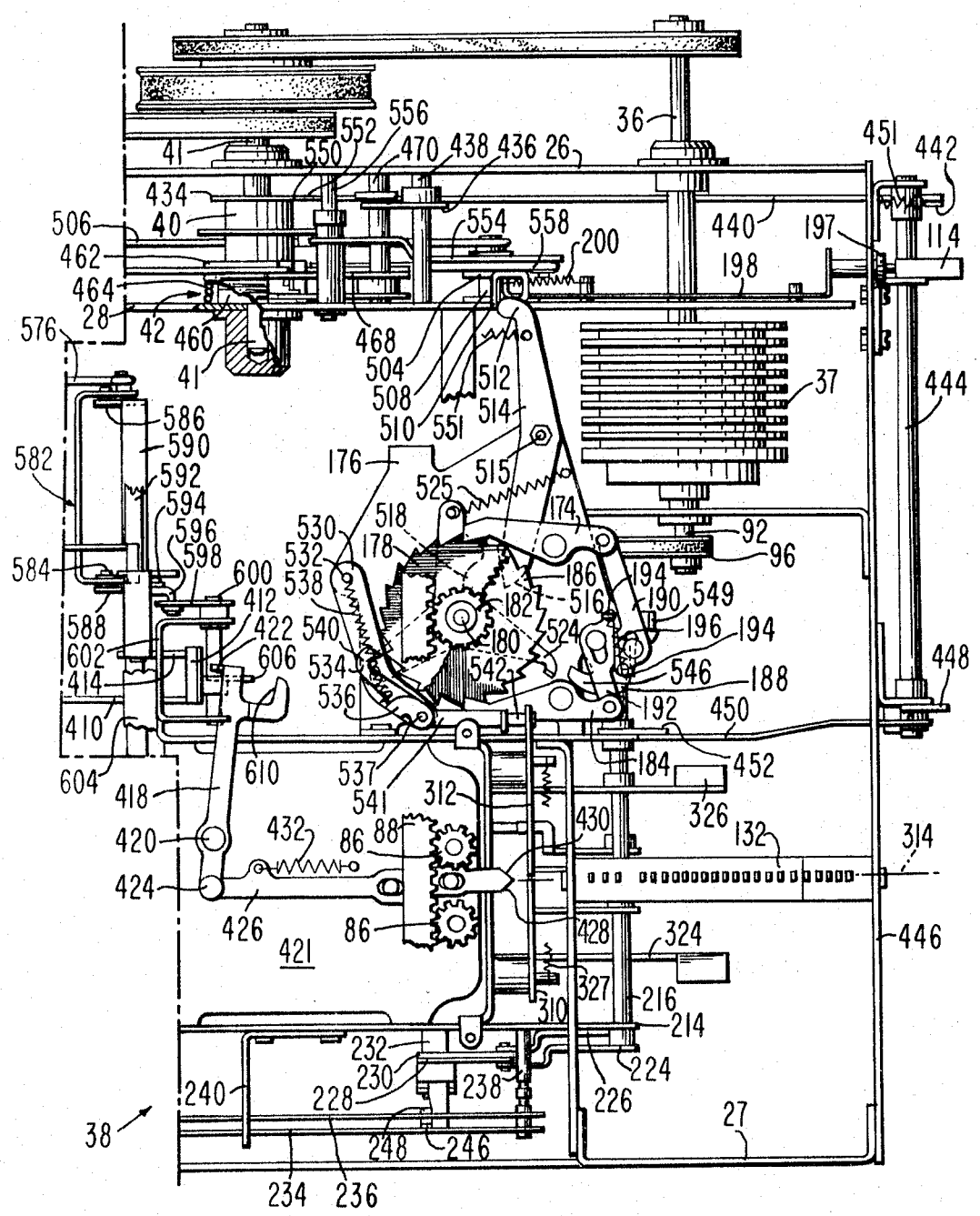
FIG. 5 is a plan view of another enlarged fragment of FIG. 3.

The hysteresis clutch 37 is used, among other reasons, to obtain a quick smooth movement of the carriage 24 and as this is a well known clutch, it is not herein shown or described in detail. In general, the clutch 37, as illustrated in FIG. 13, includes an electrical field element which is connected to the normally driven shaft 36. The driven element of the hysteresis clutch 37 drives a shaft 92 on which a pulley 94 drives another shaft 96 by a drive belt connection 98. One of the elements of the hysteresis clutch 37 is electrically energized and effects a magnetic drag to rotate the other element. To energize the hysteresis clutch 37 there is secured to the shaft 36, a pair of slip rings 100 and 102 engaged respectively by a pair of brush holding arms 104 and 106, the brushes being connected to a source of electrical energy by leads 108 and 110. In the lead 108 there is a resistance 112, controlled by a normally open switch member 114, as shown in FIGS. 5 and 14, which when closed decreases the effectiveness of ther esistance 112 with resultant increase in current flow to the hysteresis clutch 37. Thus, when the switch member 114 is open, the hysteresis clutch 37 will transmit a relatively small force acting through the normally engaged tabulation clutch 78, tending to move the carriage 24 in a tabulating direction.

The program device 74, as seen in FIGS. 6, 7 and 8, comprises a supporting plate 116, columnar spaced apart cam actuators 118 and transverse rows of control or program elements. The program elements are preferably in the form of pins which depend from the supporting plate 116 and are of different lengths representative of correspondingly different machine functions. Among the program elements there is a pin 122, FIGS. 7 and 8, which is representative of an arithmetical function, namely the normal subtract function, and is a component of the arithmetical function selecting mechanism. As previously mentioned, the arithmetical function selector 53 is normally in the position in which the additive function is effective so that no pin is required in the program for effecting the additive function. The absence of a program pin is indicated by the dot and dash lines 124 of FIG. 7. The pin 122, in FIGS. 7 and 8, is the normal subtract pin, located in the columnar position adjacent the normal add position 124. The numeral 126 designates a reverse entry subtract pin, preferably spaced 0.1 inch from the add position 124, FIG. 7, in the direction of carriage tabulation. The numeral 128, FIG. 8, designates a reverse entry add position for the subtract pin 122 and is spaced 0.1 inch from the normal position of the subtract pin in the direction of carriage tabulation.

The arithmetical function selector lever 53 is responsive to the presence of a program pin at a function selecting station and has an extension member or tappet 130 at said station, vertically guided by a guide member 132. Connecting the function selector lever 53 to the tappet 130 is an interconnecting mechanism which includes a rockable lever 134, pivotally connected, at one end thereof, to the lower end of the tappet by a pivot pin 136, FIGS. 7 and 8. Intermediate its ends, the rockable lever 134 carries a cam follower 138, preferably a roller, which rests on a cam 140, affixed to a driven shaft 142. The shaft 142 is driven from the transmission mechanism 38 each cycle of operation of the main camshaft 29. The free end of the rockable lever 134 engages under one end of a bell crank lever 144, as shown in FIGS. 2, 7 and 8, which is connected by a link 146, levers 148, link 150, lever 152 and link 154 to the upper end of a lever 156, affixed to a rotatable shaft 158. Further, the interconnecting mechanism includes a lever 160 which, like lever 156, is affixed to the shaft 158 and has one end, as at 162, bearing on the upper arm 56 of the selector lever 53. Upon a cycling operation of the main camshaft 29, the cam 140, FIGS. 7 and 8, raises the tappet 130, and if there is a subtract pin at the sensing position, it is engaged by the tappet and the lever 134 is pivoted about the pin, as a fulcrum, to depress the selector lever 53 in a clockwise direction, FIG. 2. The depressing of the selector lever 53 disengages the hook of the lower selector arm 54 from the stud of the add slide 51 and engages the hook of the upper selector arm 56 with the stud 58 of the subtract slide 52.

The amount accumulators 22 are alike and each includes a rockable frame 164 carrying pairs of meshed pinions 166 and 168 beneath the differentially positionable amount racks 47. The rockable pinion frame 164 is connected by an arm 170 affixed to a shaft 172 on which the selector lever 53 is carried by an arm 173 so that operation of slide 52 moves pinion 166 into meshing relation with the corresponding amount rack 47. Rotation of the pinion 166 in one direction has the effect of entering an amount additively into the accumulator 22 and conversely, rotation of the pinion in the opposite direction has the effect of entering an amount negatively in the accumulator, in the algebraic sense. The accumulators and their operation is fully shown and described in detail in the Butler patent.

Normally holding the carriage 24 against tabulation movement by the normally operating carriage motor 43, acting through the hysteresis clutch 37, there is a retractable stop member or arm 174 of a carriage indexing mechanism which is mounted on the transmission housing 38 by a bracket 176. The stop arm 174 normally engages a ratchet wheel 178 which is affixed to a vertical shaft 180, journaled in the bracket 176, the shaft 180 having a gear 182 affixed to the upper end thereof, in mesh with the carriage gear rack 88. A second retractable stop member or arm 184 is provided for releasably holding the carriage 24 against return movement and normally engages a second ratchet wheel 186 which is coaxial with and is secured to the ratchet wheel 178 for rotation therewith. The stop arms 174 and 184 are pivoted on a horizontal leg of the bracket 176 and outer ends of the arms are pivotally connected to a common operating lever 188 by means of links 190 and 192. Adjacent ends of the links 190 and 192 each extends beyond its pivotal connection with the operating lever 188 and has an upturned lug 194 to which is connected the opposite ends of a coil spring 196. The spring 196, under tension, acts to yieldably hold the stop arms 184, 174 in engagement with the ratchet wheels 178, 186 respectively.

When the stop arms 174 and 184 are retracted from their respective ratchet wheels 178, 186, the carriage 24 is free to travel and at the same time, the switch 114 is closed so that the full force of the hysteresis clutch 37 is applied to move the carriage. As is shown in FIG. 14, a movable switch operating member 197 of the switch 114 is on the end of a slide member 198 which is moved to close the switch by a spring 200, the spring being normally restrained by mechanism hereinafter described in detail.

Figure 12:
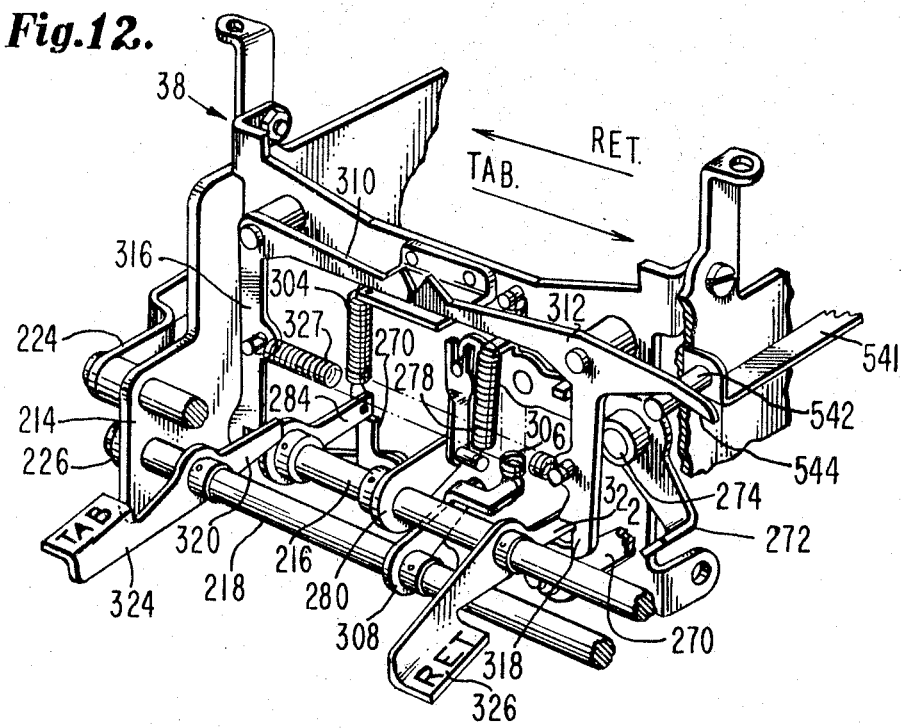

The sides of the transmission housing 38 are extended rearwardly, as at 212 and 214, and journaled in the extensions is a pair of vertically spaced horizontal shafts 216 and 218 as seen, for example, in FIGS. 11 and 12. Ends of the shafts 216 and 218 extend beneath the bracket 176 where a lever 220 is secured to the shaft 216 and is operatively connected to the actuating lever 188 of the retractable stop arms 174 and 184. As shown, the upper end of the lever 220 engages a depending stud 221 on an arm of lever 188 such that by rotating the shaft 216 clockwise, as seen in FIG. 14, the lever 188 will be pivoted in a direction to retract the stop arms 174 and 184 from the ratchet wheels 178 and 186. Secured respectively onto the shafts 216 and 218, adjacent the housing extension 214, there is a pair of levers 224 and 226, as is more clearly seen in FIG. 9, which have free ends respectively pivotally connected to the free ends of a pair of levers 228 and 230. The levers 228 and 230 pivot freely on a fixed shaft 232 which is secured at one end thereof in and to the adjacent side wall of the transmission housing 38.

Figure 9:
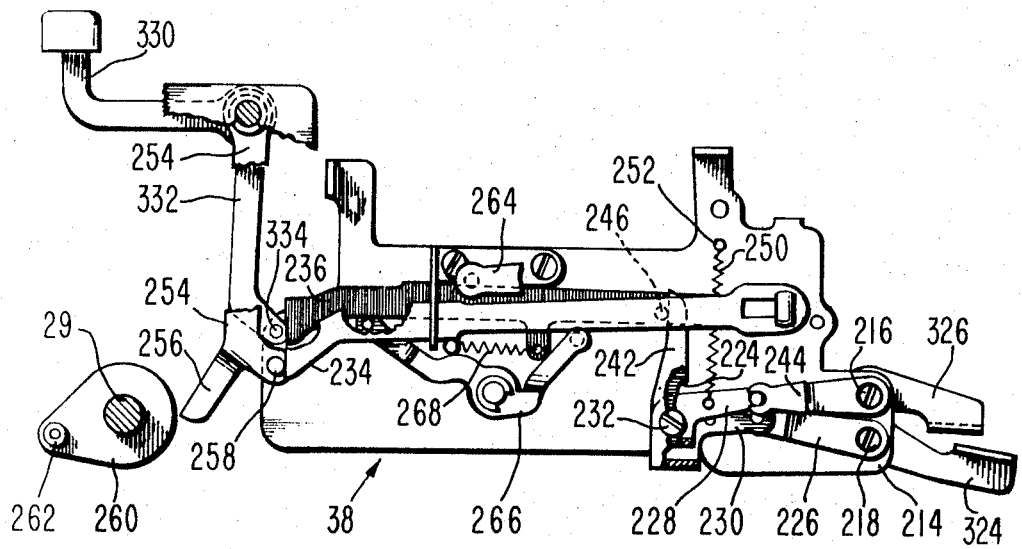
FIG. 9 is a vertical sectional view, taken along the line 9—9 of FIG. 3.
Figure 10:
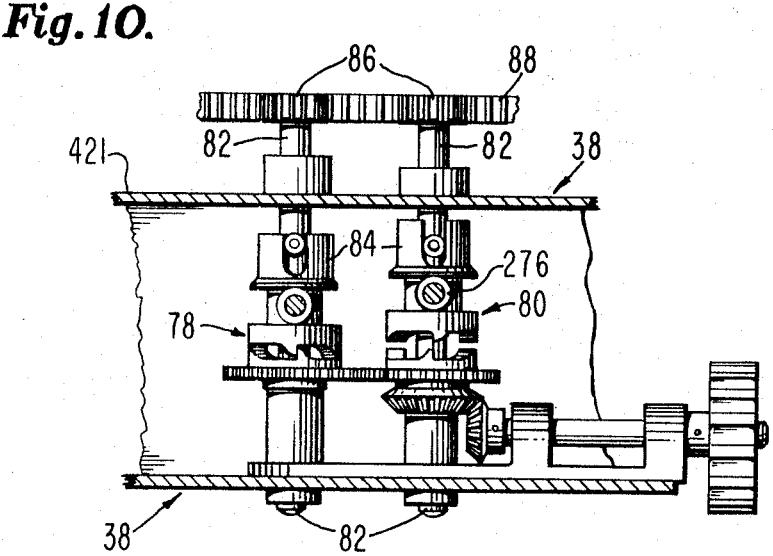
FIG. 10 is a vertical sectional view, taken along the line 10—10 of FIG. 5.

A pair of laterally positioned slide members 234 and 236 are individually movable to rotate the levers 228 and 230 respectively, the slide members being slidably supported near their rear ends in annular grooves in a horizontal pin 238 on the housing extension 214 and in slots of a comb type guide member 240, secured to the transmission housing 38. The levers 228 and 230 are of the yoke type, each having an upwardly directed operating arm 242 and 244, respectively engaged by studs 246 and 248 on the slide members 234 and 236 as shown in FIG. 13. As shown in FIG. 9, the slide members 234 and 236 are urged forwardly or to their normal positions by springs 250 acting on the levers 224 and 226, the springs being anchored at their upper ends to a pin 252 secured to the transmission housing 38.

Positioned at the forward ends of the slide members 234 and 236, FIGS. 3, 9 and 13, there is an actuator or lever 254 having a striker arm 256 which carries a transversely extending pin 258 positioned to engage one or the other of the forward ends of the slide members 234 and 236. The lever of the striker arm 256 is pivoted on the main frame of the machine and is pivotal by a cam 260 on the main camshaft 29, carrying a roller 262 that strikes and pivots the lever each revolution or cyclical operation of the main camshaft 29. The slide member 234 is moved rearwardly by the striker arm 256 when tabulation of the carriage 24 is to be effected, and the slide member 236 is moved rearwardly by the striker arm 256 when return movement of the carriage is to be effected. To avoid the striking of both ends of the slide members 234 and 236 by the striker arm 256 at the same time, the slide members are normally supported such that they can be pivoted to positions in which the return slide member 236 has its forward end raised to clear the striker pin 258 and the tabulation slide member 234 has its forward end lowered for engagement by the striker pin, as illustrated in FIG. 9. To reverse the positions of the slide members 234 and 236 so that the return slide 236 will be in position to be moved by the striker arm 256, there is a lever 264 which is arranged to pivot the return slide member 236 such that the forward end of the slide member moves down which, in turn, pivots a bell crank lever 266 that pivots the tabulation slide member 234 such that the forward end of the slide is moved to its "up" position. A coil spring 268 pivots the return slide member 236 to its normal position shown, upon release of the slide by the lever 266. Operation of the lever 264 may be under control of the program device 74 through interconnecting mechanism (not shown), but which is old in the art, as disclosed by the aforementioned Butler patent.

Mounted on the rear wall of the transmission housing 38, FIGS. 11 and 12, there is a mechanism including a latch member 270 and a lever 272 for shifting the tabulation and return clutches 78 and 80. The parts of the mechanism are shown in their normal positions, in which positions the tabulation clutch 78 is engaged and the return clutch 80 is disengaged. The lever 272 is pivoted on a stub shaft 274, secured in and to the rear wall of the transmission housing 38. One arm of the lever 272 carries a connecting member or roller 276 which engages in an annular socket in the shifter sleeve 84 of the upper component of the return clutch 80 such that pivoting of the lever 272 in a counterclockwise direction moves the upper clutch component downwardly into engagement with its lower cooperating clutch component. A helical coil spring 278 acts to pivot the lever 272 in a counterclockwise direction to engage the upper clutch component of clutch 80 with its lower clutch component. One end of the spring 278 is attached to lever 272 and the other or lower end of the spring is attached to the free end of a lever 280 which is affixed onto the return shaft 216. The latch member 270 is pivoted on the rear wall of the transmission housing 38 and, as shown in FIG. 11, has an arm provided with a hooked end 282 which normally engages and holds lever 272 latched against movement by the spring 278 and thus releasably holds the return clutch 80 engaged. Another arm of the latch member 270 is engaged at its upper end of by the free end of a lever 284 which is secured on and to the return shaft 216 as shown in FIG. 12. When the return shaft 216 is rotated as a result of the return slide 236 being moved rearwardly, the lever 284 pivots the latch member 270 in a counterclockwise direction which allows the lever 272 to be pivoted by the spring 278 in a clockwise direction to effect engagement of the clutch 80. As the return shaft 216 is being rotated to the latch releasing position, the lever 272 is pivoted in a direction which further tensions spring 278 such when the latch member 270 does release the lever 272, the spring 278 acts with additional force to engage the return clutch 80 with a quick or snap action. At the same time that the return clutch 80 is engaged, the tabulation clutch 78 is disengaged by a lever 286 which is actuated by the latch member 270. As is more fully shown in FIG. 11, the lever 286 is pivoted, as at 288, on the rear wall of the transmission housing 38 and has an arm 290 engaged by a similar arm 292 of a bell crank lever 294. The bell crank lever 294 is pivoted on the rear wall of the transmission housing 38 and has an arm 296 that is pivotally connected, as at 298, to the lever 270. The lever 286 carries a connector or roller 300, engaging in an annular socket of the upper tabulation clutch component 78. A coil spring 302, connected at one end thereof to the lever 286 and at the other end to the housing 38, acts to effect engagement of the tabulation clutch 78. Thus, when the latch member 270 is pivoted by the lever 272 to effect engagement of the return clutch 80, the latch member 270 also pivots lever 286 in a direction to effect disengagement of the tabulation clutch 78. A coil spring 304, shown in FIG. 12, has one end anchored to the housing 38 and the other end connected to the lever 284, the spring acting to rotate the return shaft 216 to its normal position shown. Similarly, a coil spring 306, connected to housing 38 and to the free end of a lever 308, acts to return the tabulation shaft 218 to normal position.

As shown, for example, in FIG. 6, one of the carriage mounted cam members 118 is being releasably held by the indexing mechanism stop arms 174 and 184 between the opposed ends of a pair of latch members including a carriage tabulation latch member 310 and a carriage return latch member 312. Also, a row of the program pins including the subtract pin 122 is in vertical registration with the row of sensing tappets, including tappet 130, in a vertical plane 314 that passes between the opposed ends of the latch members 310 and 312, as illustrated in FIGS. 5 to 8 and 14.

The latch member 310 is provided to hold the ratchet wheel stop arms 174 and 184 retracted until tripped by a columnar cam 118 on tabulation movement of the carriage, and the latch member 312 is provided to hold the ratchet stop arms retracted until tripped by a columnar cam 118 on return movement of the carriage. The latch members 310 and 312 are pivotally mounted on the housing 38 and have depending arms 316 and 318 which are notched at their lower ends to latch with forwardly extending arms 320 and 322 of tabulation and return levers 324 and 326, affixed respectively onto the tab and return shafts 218 and 216. A coil spring 327 has its opposite ends connected to the latch arms 316 and 318 and is under tension so as to normally urge the arms to latch respectively with the lever arms 320 and 322. Whereas the spacing between adjacent teeth of the ratchet wheels 178 and 186 may be equal to the usual distance (0.1 inch) between typewritten digit characters, the spacing between adjacent latch trip cams 118, or columnar spacing, is equal to the sum of a number of the digit character spaces.

From the above description, it will now be understood that during a cycle of operation of the main camshaft 29, the striker arm 254 is actuated and moves the slide member 234 rearwardly which through rotation of lever 242, shaft 218, and lever 188, retracts the stop arms 174, 184 to release the tabulation ratchet wheel 178. Since the tabulation clutch 78 is normally engaged, and switch operating member 178 is closed when the stop arms 174 and 184 are retracted, the full power of the hysteresis clutch 37 will be applied to move the carriage 24 in a tabulating direction. Also, when the stop arms 174 and 184 are retracted, the lever 324 is rotated in a direction and to a position where the latch arm 316 is moved by the spring 327 into latching relation with lever arm 324 to hold the stop arms retracted. As the carriage approaches the next columnar position, the corresponding one of the cam members 118 strikes the upper cam formed end of the latch arm 316 which releases the stop arms 174 and 184, allowing them to reengage the ratchet wheels 178 and 180 to stop the carriage. Control of cariage columnar movement in a return direction operates substantially the same as described above for tabulation movement. On the keyboard 21 there is provided a key 330, as shown in FIGS. 9 and 13, having a stem 332 which carries a stud 334 for engaging the forward end of the carriage return slide member 236 such that depression of the key will effect a return of the carriage 24 to its next preceding position. This key is used preparatory to the making of a correction at said next preceding columnar position of the carriage. For a more detailed description of the carriage tabulation and return mechanism, reference may be had to the aforementioned patent to Henderson.

With reference particularly to FIGS. 18 and 19, the clutch 35 for connecting the camshaft 29 to the motor 43 is a well known type of clutch which comprises, in general, a driving clutch member or notched disc 362 and a driven clutch member or C-shaped pawl 364. The C-shaped clutch pawl 364 extends substantially around the notched periphery of the clutch disc 362 and is pivotally connected, as at 366, to the outer end of an arm 368 which is affixed to the driven camshaft 29, as shown in detail in the Butler Patent. The clutch disc 362 is rotatably supported on the camshaft 29 and connects the camshaft to the drive shaft 367 when an inwardly directed tooth 369 on the clutch pawl 364 is moved into engagement with one of the notches of the clutch disc 362. A spring 370 acts to rotate the clutch pawl 364 clockwise, as seen in FIG. 19, to engage the clutch members and is normally restrained by a retractable stop member 372. As shown, the stop member 372 comprises the end of an arm 374 of a bail which is affixed to a rotatable shaft 376 and is biased by a spring 378 in a clockwise direction, tending to release the clutch pawl 364. Normally, the spring 378 is restrained by a latch member in the form of an arm 380 which has a latching shoulder 382 on which the end of a second and longer arm 384 of a bail type lever 385 is normally engaged. Like the stop arm bail 374, the bail 385 is affixed to the rotatable shaft 376 and thus the said bails 374 and 385 pivot together, as shown in FIGS. 3 and 4.

Affixed to the rotatable shaft 376, adjacent the rightward side of the machine, there is a lever 386, FIG. 19, which is operatively connected to the clutch trip key 45 by interconnecting mechanism including an arm 388, the arm being connected to the key 45 as shown and described in the above mentioned Butler patent. A tension spring 390 is attached to an arm of lever 386 and urges the lever 386 counterclockwise. Another arm 392 of lever 386 is held by the spring 390 in engagement with one end 394 of a lever arm 396 which is pivotally mounted on a fixed shaft 398. A spring 400 urges lever arm 396 clockwise and becomes effective upon retraction of the arm 392 by depression of the key 45. Another lever 402 is affixed to a rotatable shaft 404, just below the shaft 398, and, extending upwardly therefrom, abuts a stud 406 in the upper end of lever 396. A spring 408 urges the lever 396 against the stud 406 in a clockwise direction such that both of the levers 396 and 402 will rotate clockwise under the influence of springs 400 and 408 upon the retraction of lever end 392 from lever end 394. Also affixed to the rotatable shaft 404 is one end of a lever 410 which pivots with lever 402, the lever 410 having a laterally extending end portion 412 overlying a lever arm 414 of the latch lever arm 380 which is rotatable on a fixed shaft 416. A spring 381 is provided to bias the lever arm 380 in a counterclockwise direction as shown in FIG. 20, and yieldably holds the lever in latched engagement with the lever 384.

Upon the depression of the clutch trip key 45, the lever 386 is pivoted clockwise, FIG. 19, which retracts the stop arm 392 away from the lever end 394, thus allowing springs 400 and 408 to pivot levers 396 and 402 clockwise. As this occurs, the arm 410 of lever 402 swings downward and engages arm 414 and pivots the latch arm 380 out of latching engagement with the lever arm 384. As a consequence, the released arm 384 is pivoted clockwise which disengages the clutch stop member 372 from the clutch pawl 364 whereupon the clutch pawl is free to engage one of the notches of the clutch disc 362 to effect a one revolution cycle of operation of the clutch 35. For a more complete understanding of the clutch 35 and associated mechanism, reference may be had to the aforementioned Butler patent.

As in the Butler machine, there is a normally retracted stop member 418 which is movable to a position to block lever arm 410 to prevent operation of the cyclically operable clutch 35 unless the carriage is in one of the columnar positions identified by or corresponding to one of the cam members 118, the purpose being to prevent a cycling operation of the camshaft 29 during carriage travel, or if for any reason the carriage stops between columnar positions as would occur, for example, in a typing operation. The stop member 418 is in the form of a lever which is pivoted on a pin 420 secured to and projecting upwardly from the top 421 of the transmission housing 38. One end of the lever 418 is provided with a downturned end portion or hook 422, which is arranged to engage under the tab 412 of the lever 410 during carriage travel between columnar positions as shown in dot and dash lines in FIG. 19. The other end of the lever 418 is pivoted, as at 424, to one end of a link or slide member 426 which is longitudinally aligned with the vertical plane 314 of the function selecting station, as shown, for example, in FIGS. 5 to 8. Adjacent the other end of the slide member 426, side edge portions thereof are tapered to a point to provide cams 428 and 430, and this pointed end of the slide member 426 is urged into the path of the carriage mounted cam strikers 118 by a spring 432. It will be apparent that when the cam striker 118 releases the slide member 426 as the carriage moves to the next columnar position, the spring 432 moves the slide member rearwardly to pivot the lever 418 counterclockwise whereby the hook 422 engages under the lever tab 412, thus blocking the initiation of a cycle of operation of the camshaft 29. On arrival of the carriage at said next columnar position, the corresponding one of the strikers 118 will strike and move the slide member 426 to retract the blocking lever 418 so that the camshaft clutch 35 may be engaged by depression of the key 45 to initiate a cycle of operation.

Affixed onto the driven camshaft 40 of the clutch 42 there is a cam 434, as shown in FIG. 14, which is operatively connected to the carriage indexing arms 174 and 184 and is operable to retract the latter to release the carriage. The cam 434 is operatively connected to the operating arm 188 of the carriage indexing mechanism by interconnecting mechanism which includes a cam follower or lever 436 which has a roller 437 on its upper end engaging the cam, the lever 436 being pivoted, as at 438, to and between the side frame plates 26 and 28, as shown in FIG. 5. To a depending arm of lever 436 is connected one end of a link 440 which in turn is pivotally connected to the lower end of a lever 442, affixed to a horizontal shaft 444 which is journaled for rotation on a frame cross member 446. Also affixed to the rotatable shaft 444 there is an upwardly extending arm 448 which is connected by a link 450 to the lower end of an arm 452, affixed to the carriage return shaft 216. A return spring 457 has one end connected to the upper end of the lever 442 and the other end anchored to the frame cross member 446. Upon engagement of the clutch 42, the cam 434 is rotated and through the linkage including the cam follower lever 436, link 440, lever 442, shaft 444, lever 448, link 450 and lever 452, the shaft 216 is rotated clockwise whereby arm 220 strikes the abutment 221 causing the ratchet holding arms 174, 184 to be retracted so as to release the carriage 24.

Figure 23:
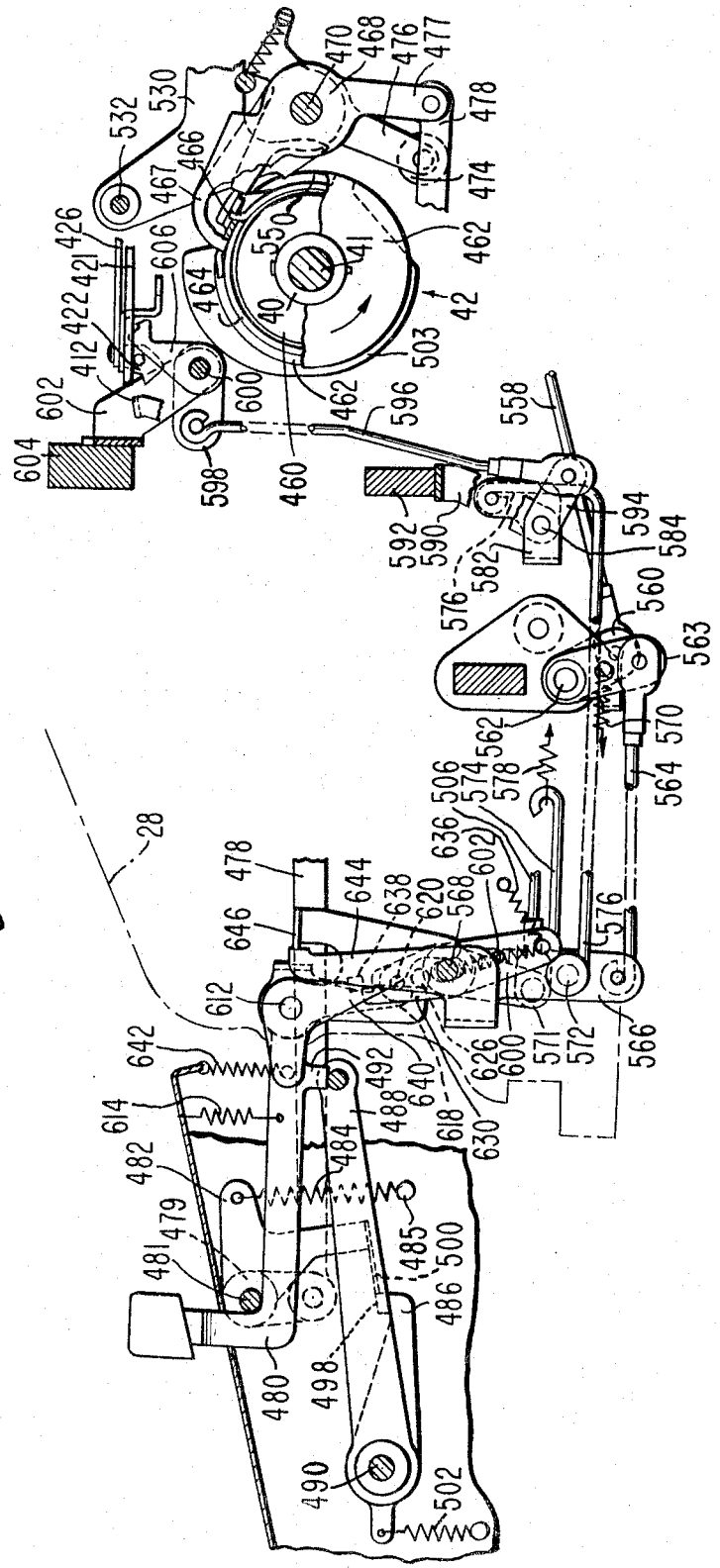
FIG. 23 is an enlarged view, similar to FIG. 18, showing certain operating parts in their normal positions.

The clutch 42 is a conventional one revolution type of clutch which comprises, in general, a drum 460, a disc 462 and a coil spring 464 as shown for example in FIGS. 23 and 27. The drum 460 is affixed onto the driving shaft 41 and the disc 462 is affixed onto the camshaft 40 which is a tubular shaft or sleeve to receive the driving shaft. The spring 464 surrounds the drum 460 and at one end has a laterally directed tang 465 which engages in a notch in the periphery of the clutch disc 462. A similar tang 466 on the other end of the spring 464 is normally engaged by an upper arm 467 of a clutch operator or lever 468. The spring 464 is made such that its inner diameter is less than the outer diameter of the clutch drum 460, but the spring is normally held circumferentially expanded and thus under tension in disengaged position by the clutch operating lever 468. The clutch operating lever 468 may be pivotally mounted on a fixed shaft 470, which extends between and is mounted on the frame plates 26 and 28 as shown in FIG. 3. Rotatable with the clutch disc 462 there is a clutch timing cam 472 which is adapted on rotation thereof to engage an abutment or roller 474 on an arm 476 of the clutch operating lever 468 to effect reengagement of the upper arm 467 with the spring tang 466 just prior to completion of a cycle of operation of the clutch 42. The arm 476 is rotatable on the fixed shaft 470 and is connected to rotate with arm 468 by a web 477. Connected to another arm of the clutch control lever 468 is one end of a connecting link 478 which extends forwardly and has its other end connected to the lower end of a lever arm 479 which is affixed onto a rotatable shaft 481. The shaft 481 is journaled for rotation on a keyboard structure adjacent a key 480 which is hereinafter referred to as a reverse entry key. As shown in FIG. 23, a lever arm 482, which may be pinned or be otherwise affixed onto the shaft 481, is provided and is biased in a clockwise direction by a force exerting means or tension spring 484 which is acting to rotate shaft 481, and through link 478 activates the clutch 42. The spring 484 is anchored at its lower end to the keyboard structure, as at 485. A retractable latch member 486 normally restrains the spring 484 and is retractable by and upon depression of the key 480. The key 480 is operatively connected to the latch member 486 by mechanism including a lever 488 which is affixed onto a rotatable shaft 490 and has a free end beneath and in engagement with a downwardly directed abutment 492 on the reverse entry key 480. The latch member 486 is integral with the lever 488 in the form of a bail having an end portion 498 normally in abutting relation with an extension 500 of the lever 482 to restrain the operating spring 484. A spring 502 is provided and connected to the lever 488 to return the lever to its normal position shown in FIG. 23.

Figure 24:
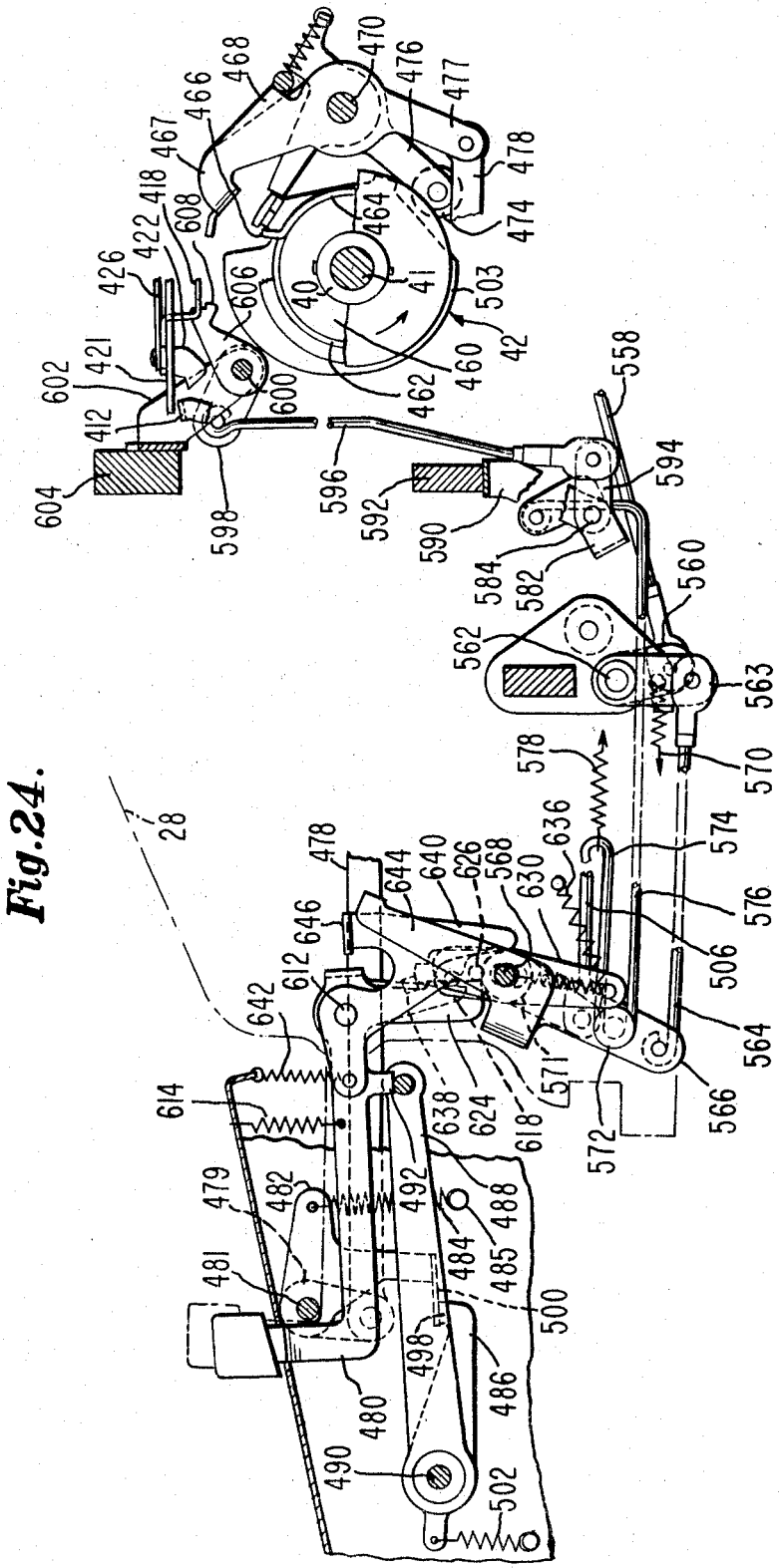
FIG. 24 is a view similar to FIG. 23, showing the operating parts in the positions they assume following the initiation of a reverse entry operation.

In the operation of the above described key operated mechanism, when the reverse entry key 480 is depressed, the lever 488 is pivoted clockwise, facing FIG. 23, and the latch arm 486 of lever 488 is moved away from and out of engagement with extension 500. This frees the spring 484 which then pivots lever 482 clockwise and through the link 478 pivots the operating lever 477 of clutch 42 thereby to initiate a clutch operating cycle. In initiating the clutch operation, the spring 484 swings the extension 500 over the upper end 498 of the latch arm, as illustrated in FIG. 24, to restrain the spring 502. This provides for holding the clutch operating lever 468 in retracted, clutch engaging position while allowing the reverse entry key 480 to restore to its normal position when released by the operator. Near the completion of a cycle of operation of the clutch 42, its timing cam 472 acting against roller 474 pivots the clutch control arm 476 to effect disengagement of the clutch and simultaneously therewith pivots arm 477 counterclockwise, facing FIG. 23. This draws the link 478 rearwardly which pivots the extension 500 out of engagement with the latch arm 486 whereupon the spring 502 becomes effective to restore the lever 488 to its normal position.

From the above description, it should now be understood that upon depression of the reverse entry key 480, the clutch control lever 468 is operated to effect engagement of the one revolution clutch 42 whereupon to drive the cam 434 and retract the carriage indexing mechanism arms 174 and 184 so as to release the carriage for movement by the motor 43 via the hysteresis clutch 37. Also affixed onto the driven clutch shaft 40 there is a cam 503 which rotates with the cam 434 and is provided to restore certain hereinafter described mechanism to normal or starting positions.

In addition to activating the one revolution clutch 42, the reverse entry key 480 pivots a lever 504, as best seen in FIG. 18, the lever being operatively connected to the reverse entry key 480 by a mechanism including a link 506. The lever 504 is operatively connected to the carriage indexing mechanism control arms 174 and 184 to release the latter to stop the carriage. The lever 504, as shown in FIG. 18, is pivotal on a pivot pin 508 secured in and to the frame plate 28, and has an upwardly projecting end 510 in abutment with a free end 512 of another lever 514 which is pivoted, as at 515, an the bracket 176. As is more clearly seen in FIGS. 14, 15 and 16, the lever 514 has an end portion 516 in position to engage an arm 518 of a lever 520 which is rotatable about shaft 80 and has two additional arms 522 and 524. The arm 522 carries a pin 526, engaged in an arcuate cam slot 528 in a lever 530 which is pivoted at one end thereof on the bracket 176 by a vertical pivot pin 532. Carried by the free end of the lever 530 there is another lever 534 which has an upper arm 536 in spaced parallel relation thereto, the lever 530 and the arm 534 being rigidly connected together by a pin 537 which projects downwardly and connects lever 534 to lever 530 for relative pivotal movement. A coil spring 538 has one end thereof attached to the arm 534 and the other end anchored to the pin 532 such that the spring tends to rotate the lever 534 clockwise, as seen in FIGS. 15 and 16. The lever 534 has one arm provided with a laterally extended end portion 540, arranged to engage the inclined face of a tooth of the ratchet wheel 178 and has another arm carrying a stud 542 which is normally held by the spring 538 against a cam 544 on the extended end of the latch arm 312. The spring 538 exerts only sufficient force to maintain the stud 542 in contact with the cam surface 544 on the extended end of the latch arm 318. At the same time that the ratchet wheel stop arms 174, 184, are retracted, lever 514 is pivoted clockwise and pivots lever 520 whereby the pin 526 moves along the cam slot 528 causing the lever end 540 to engage the inclined face on an adjacent tooth of the rotating ratchet wheel 178. At this position of the lever 520, its arm 524 is in latched position, against return movement, by an arm 546 of the operating lever 188 of the ratchet stop arms 174 and 184, as shown in FIG. 17. As the ratchet wheel 178 rotates with the lever end 540 engaging the inclined surface of a ratchet wheel tooth, the lever 534 is pivoted counterclockwise, facing FIG. 5, and the stud 542 abutting the cam formed end of the latch lever 312 pivots the lever in a direction to release the carriage return lever 326. As a consequence, the carriage return shaft 216 is released and is biased to its normal position whereupon the lever 326 is pivoted to effect the release of the carriage stop arms 174, 184 which then engage the ratchet wheels 174, 184 to stop the carriage. When this occurs, the arm 546 is retracted to the position shown in FIG. 5, disengaging from arm 524 which allows lever 520 and associated mechanism to return to their normal positions by the spring 548. An arm 547 of lever 188 engages a stop member 549 on the bracket 176 to limit counterclockwise rotation of the lever 188. Extending forwardly of the upper arm of the lever 504 there is a laterally disposed end 549 of the slide member 198 which is held in contact with the lever arm by the spring 200, as shown in FIGS. 14 and 15. Another spring 551 is connected to lever 514 to return the lever and also lever 504 to their normal positions, the spring 551 exerting a greater force than the spring 200 to normally overcome the latter spring.

From the above description it will be understood that the depression of the reverse entry key 480 activates the clutch 42 to initiate retraction of the carriage holding arms 174, 184 and at the same time pivots lever 504 to initiate a release of the carriage holding arms. The timing of the retraction and the release of the carriage holding arms 174, 184 is such as to allow for a one tooth escapement of the ratchet wheel 186 and thus a corresponding return movement of the carriage. Since as previously mentioned the angular distance between adjacent teeth of the ratchet wheel 186 is 0.1 inch, it follows, of course, that the return movement of the carriage effected by depression of the reverse entry key 480 is 0.1 inch. At this point of the description, it should be recalled that the reverse entry substract pin 126 is located 0.1 inch from the sensing station 314 in a tabulation direction as illustrated in FIG. 7, when the carriage is in add position. Consequently when the carriage is moved 0.1 inch in a return direction, the pin 126 is moved into registration with the sensing pin 130 to effect the opposite of an add function upon a cycling operation of the machine. In a similar manner, if the carriage had been originally in a position with the normal subtract pin 122 at the sensing station, as illustrated in FIG. 8, a reverse entry key operation would cause the carriage to move 0.1 inch in a return direction, thus moving the pin 122 out of registration with the sensing pin 130. In this case, a cycling of the machine would effect an add operation which is the normal operation when there is no pin at the sensing station.

Affixed onto the camshaft 41 there is a disc 550, as shown in FIG. 18, on which is mounted a striker, preferably a roller 552 to strike and pivot a lever 554. An upper end of the lever 554 is pivoted on a fixed shaft 556 which is secured in and to frame plates 26, 28, the lower end of the lever 554 being connected to one end of a link 558 which extends forwardly from the lever 554 between the frame plates 26, 28 and is connected to an arm 560 which is affixed to a rotatable stub shaft 562, journaled in the side plate 28, as shown in FIG. 23. A second arm 563 is affixed to the stub shaft 562 on the inward side of the frame plate 28 and has one end of a link 564 connected thereto, the other end of the link 564 being connected to the lower end of a lever 566 which is pivoted on a rotatable shaft 568 adjacent the reverse entry key 480. A return spring 570 connected to the arm 563 urges the lever 566 in a clockwise direction, as viewed in FIGS. 17, 23 and 24. The shaft 568 is journaled on the side plate 28 and affixed onto the shaft there is a lever 571 to which the link 506 is connected.

Secured to one side of the lever 566 there is a pin 572 having an annular groove in its periphery to slidably retain a looped end 574 of a link 576, the loop being formed by bending an end portion of the link back in parallel relation to the link proper. To this end of the link 576 is connected one end of a coil spring 578 which has its other end anchored to the frame plate 28 by a bracket 580. The other end of the link 576 is pivotally connected to a bail 582 which is pivoted, as at 584, to the downwardly directed arms 586 and 588 of a bracket 590, the bracket being secured to a frame cross member 592. With reference to FIGS. 18, 23 and 24, it will be seen that the fulcrum 584 of the bail 582 is forwardly of the point of attachment of the link 576 to the bail arm and as a consequence the bail will pivot counterclockwise when the link 576 is pulled leftward. The bail 582 has a downwardly and rearwardly extending arm 594 to which a lower end of a link 596 is pivotally connected. The upper end of the link 596 is pivotally connected to the free end of a lever 598 which is affixed onto a shaft 600, journaled in a bracket 602 which is rigidly mounted on a frame cross member 604.

In accordance with our invention including the above described backspacing of the carriage to a position in 422 retracted so that the clutch 35 may be activated to effect the reverse entry operation at a carriage position other than the columnar position. The stop means 606 has an

*Detail description of key operated lever mechanisms* upper projection 608 which is notched and arranged to engage an edge 610 of a depending abutment on the latch arm 418, as shown in FIG. 22. This occurs by depression of the reverse entry key, the action of which is transmitted by the levers, links, and shaft 600 to pivot the latch arm 606 clockwise into position for engagement by the lever edge 610.

As is more clearly shown in FIG. 26, the key 480 is pivotally mounted on a stub shaft 612 which is fixed in and to the supporting plate 28 in parallel relation to the rotatable shaft 481. A coil spring 614 returns to key 480 to its "up" or normal position. The key 480 has a laterally positioned, downwardly extending arm 618 which engages an abutment or pin 620, projecting laterally from the upper end of an arm 622 which is affixed onto the rotatable shaft 568. Thus, upon depression of the key 480, the key arm 618 acting against the pin 620 will rock the arm 622 clockwise to rotate the shaft 568 and lever 571 clockwise. As previously mentioned, depression of the reverse entry key 480 also effects clockwise rotation of the arm 479 which draws the link 478 forward to activate the clutch 42 and thus initiate a carriage backspace operation. The key 480 has another downwardly directed stop means or latch arm 606 is provided to hold the latch arm 624 which abuts a stud 626 affixed to the upper end which the program calls for a reverse entry operation, a of a lever 628 which is rotatable on the shaft 568. A vertically movable latch member 630 is carried by the lever 628 and is provided with a large clearance hole to receive the shaft 568. In its lower arm, the lever 628 carries a connecting pin 632 which projects into a vertically elongated aperture in the latch member 630 to provide for rotation of the lever and latch member together and also allow vertical movement of the latch member 630 relative to the lever 628. A spring 634 urges the latch member 630 upwardly and a return spring 636 urges lever 628 and latch member 630 in a counterclockwise direction to normal position, as shown, for example, in FIG. 26. The upper end of the latch member 630 engages an abutment or square stud 638 on one side of a lever 640 which is pivotally mounted on the stub shaft 612, the lever 640 being biased in a clockwise direction, as shown in FIG. 26, by a tensioned coil spring 642. The spring 642 urges the lever 640 clockwise and normally holds the bail type lever 566 against clockwise rotation by the spring 570, the lever 566 having an upwardly extending arm 644 normally in engagement with an abutment 646 on the lever 640.

*General description of operation*

In the operation of the machine, an amount is indexed into the keyboard by the depression of the corresponding amount keys 44 and the clutch trip key 45 is depressed to activate the one revolution clutch 35 whereupon a cycle of the main camshaft 29 is initiated. As is well known, rotation of the camshaft 29 moves all of the differentially positionable amount racks 47 forwardly against limits established by the stop slides 46 to position the print heads 50, and after the printing operation, the racks move rearwardly to their starting positions. In the herein described machine, the forward movement of the amount racks 47 is utilized to enter amounts subtractively in the accumulators 22 and the rearward movement of the racks is utilized to enter amounts additively in the accumulators. Assuming, for example, that the carriage 24 is at the columnar position where the subtract pin 122, as illustrated in FIG. 8, is at the sensing station 314, calling for the entering of the amount subtractively in the accumulators 22, the accumulator arithmetical funtcion selector arms 174 will be connected by the arm 54 to the subtract slide 52. This connection is made near the start of the cycle of operation of the camshaft 29 and results in rotation of levers 170 which swing the accumulator pinions 168 upwardly into mesh with the amount racks 47 to enter the amount subtractively into the accumulators 22. The connector lever 53 responds to the subtract pin 122 through connections to its rockable extension lever 144 which is rocked by the cam 140 until the tappet 130 engages the subtract pin. At a point near the end of the cycle of operation of the camshaft 29, the carriage 24 automatically moves in a tabulation direction to the next columnar position.

If now the operator discovers that the amount entered in the keyboard and therefore in the accumulators 22 was erroneous, correction may be made by depressing the reverse entry key 480. However, before depressing the reverse entry key, the operator must depress the carriage return key 330, so as to return the carriage to the columnar position where the erroneous amount was entered, or position shown in FIG. 8. As previously mentioned, depression of the return key 330 causes the positions of the normally engaged carriage tabulation clutch 78 and the normally disengaged carriage return clutch 80 to be reversed and activates the clutch 35 to effect columnar return movement of the carriage.

By the depression of the reverse entry key 480, four principal operations are initiated including (1) rotation of lever 504 (FIG. 14) to move the lever end 540 (FIG. 15) into engagement with a tooth of the ratchet wheel 186, (2) activation of the one revolution clutch 42 to effect retraction of the ratchet stop arms 174, 184 so that the carriage can be moved via the hysteresis clutch, (3) release the carriage return latch arm 326 to effect engagement of the carriage return clutch 80 (FIG. 11) and the disengagement of the carriage tabulation clutch 78, and (4) movement of the stop means 606 to its effective position holding the slide member 426 in ineffective position so that the clutch 35 can be tripped to effect a machine cycle of operation. The above mentioned functions occur in the order stated, the switch 114 also being closed to increase the power output of the hysteresis clutch 37 through which the carriage has now been moved 0.1 inch in a carriage return direction. This positions the carriage such that there is no program pin at the sensing station 314, the lack of a pin being designated by the dot and dash lines 128 of FIG. 8.

When the ratchet wheel 186 is released by the retraction of the ratchet stop arms 174, 184, the ratchet tooth engaged by the lever arm 540 pivots the lever 541 and the pin 542 cams the latch lever 318 counterclockwise. As a consequence, the shaft 216 (FIGS. 12 and 14) is rotated to release the ratchet wheel arms 174, 184 to stop the carriage, the interval between retraction and release of the ratchet stop arms 174, 184 corresponding to a one tooth movement or 0.1 travel of the carriage. Simultaneously with the release of the ratchet stop arms 174, 184, the carriage return clutch spring 278 is overcome and the clutch is return to its normally disengaged position and the tabulation clutch 78 to its normally engaged position.

In order to cancel the erroneous amount entered in the accumulators 22, the operator now re-enters the amount on the keyboard 21 and depresses the clutch trip key 45 which activates the one revolution clutch 35 and consequently the camshaft 29. Among other things, the accumulator function responsive arm 170 responds to an absence of a program pin at the station 314, or calls for an add operation, so that the connector 53 remains connected to the add slide 51. As a consequence the amount is entered additively into the accumulators 22 which algebraically cancels the previously, subtractively entered erroneous amount. Near the end of the cycle of operation of the camshaft 29, the carriage is released and is tabulated 0.1 inch to the columnar position where the error occurred.

*Detail description of operation*

With respect to the operation of the lever 640, FIG. 18, by the reverse entry key 480, it will be understood that the spring 570 is exerting a force capable of moving the connecting links 564 and 576 forwardly and respectively setting the restoring lever 554 and positioning the stop means 606 in effective position. However, the spring 570 is normally restrained by the stronger spring 642 acting through lever 640 to prevent rotation of the lever 644 to which the links are connected. Depression of the reverse entry key 480 overcomes the spring 642 to allow the spring 570 to become effective whereupon the operating parts assume the positions shown in FIG. 24. When the key 480 was depressed, the key arm 618, abutting the pin 620, rotated the shaft 568 to set the lever arm 540 (FIG. 15) against a tooth of ratchet wheel 186 and tripped the clutch 42 whereby cam 434 operating through linkage 436, 440, 442, 444, 448, 450, 452, 216, 220 pivoted the arm 188 to retract the ratchet wheel stop arms 174, 184. Upon release of the ratchet wheels, they rotate with carriage movement and through arm 541 trip the latch arm 318, as above described, to release arms 174, 184 and stop the carriage to effect a 0.1 back spacing operation. Also upon depression of the key 480, the key arm 624, (FIG. 26), engaged and rotated the lever 628 clockwise on the shaft 568. By reason of the connecting pin 632, the latch arm 630 is rotated with the lever 628, and the latch arm 630, in abutment with the stud 638, rotates the lever 640 counterclockwise which extends and overcomes the force of the spring 642 and moves the lever abutment 646 out of the path of the upper end of the lever 644, as shown in FIG. 24. This allows the spring 570 to pivot the lever 644 to the position shown as the spring 570 sets the stop means 606 and the restoring lever 554, FIG. 18. Returning to FIG. 26, as the latch arm 630, abutting the square stud 638, pivots the lever 640 counterclockwise, the latch arm 630 is depressed by reason of the connecting pin 632 in the vertical slot in the latch arm so that the square stud moves over the upper end of the latch arm 630 and is held in the latched position shown in FIG. 24. This latching arrangement to overcome the spring 642, and the previously described latch member 486 for overcoming the spring 484 makes it possible to effect the 0.1 inch backspacing of the carriage to reverse entry position with a key 480 which can return to normal position by the return spring 614 upon release of the key by the machine operator, if for some reason the operator should rapidly depress the key 480 more than once, the latch member 630 will prevent repetitive backspacing of the carriage. As previously mentioned, depression of the key 480, in addition to setting the stop member 606 and the restoring lever 554, trips and activates the clutch 42. With reference to FIG. 14, activation of the clutch 42 causes cam 434 to be driven and through connecting linkage including levers 436, 442, 448, 452, 220 and 188 to retracts the carriage indexing stop arms 174, 184, to release the carriage. Just prior to release of the carriage, the depression of the reverse entry key 480 pivots the lever 622 through the engaging abutments 618 and 620 and rotates shaft 568 clockwise, FIG. 26, and through link 506 pivots lever 504 in a counterclockwise direction, as seen in FIG. 14. This pivots the lever 514 clockwise, as best seen in FIGS. 15 and 16, and the end 516 of the lever 514 engages and pivots the lever 520 counterclockwise. The pin 526, riding in the cam slot 528 causes the hook end 540 of lever 534 to move into engagement with a tooth of the ratchet wheel 186 which cams the arm 541 in a counterclockwise direction, as seen in FIG. 15. The pin 542, carried by the arm 541, moves along the cam 544 on the underside of the extension of latch lever 312, as shown in FIG. 13, and pivots latch arm 318 in a counterclockwise direction to release the carriage return lever 326. This allows spring 278, which is best shown in FIG. 12, to rotate the lever 280 and thus the shaft 216 in a counterclockwise direction which, as seen in FIG. 14, rotates the arm 220 away from the abutment 221 on the index mechanism operating arm 188, thus to release the ratchet stop arms 174 and 178. On their release, the arms 174 and 178 reengage the ratchet wheels to stop the carriage. The timing of the above mentioned mechanisms which first retract and then release the ratchet stop arms is such that the carriage return movement is equal to one ratchet tooth space or 0.1 inch of travel, or backspace movement. In addition, as previously mentioned, the stop means 606 is set in its effective position, FIG. 22, by the spring 570 acting through the links 576 and 596 whereby the function of holding the clutch control arm 418 in retracted clutch release position is transferred from a cam member 118 to stop means 606. Further, the restoring lever 554 is pivoted by the spring 570 to effective position through the links 564 and 558. Just prior to completion of its cycle, the timing cam 503 of the one revolution clutch 42 pivots the clutch operating lever 468 into position to effect declutching and at the same time pulls the link 478 rightward, FIG. 23, to rotate shaft 481 and thus retract arm 482 from the latch arm 486 whereby the spring 642 is released and overcomes spring 570, but because of the loop 574 or lost-motion connection with lever 566, the pin 572 slides along the loop so that the stop means 606 is not retracted at this time, as shown in FIG. 25. Also, the striker 552 strikes and rotates the lever 554 counterclockwise, FIG. 18, which allows lever 566 to return to its normal position. The operator now indexes the erroneous amount into the keyboard and depresses the key 45 which initiates the clutch 35 to enter the amount additively into the accumulators 22 so as to algebraically cancel the erroneous amount which was previously entered substractively. During rotation of the camshaft 29, FIG. 9, the striker 262 strikes lever arm 256 and the lever pin 258 moves the slide 234 which pivots lever 242 and levers 228 and 224 so as to rotate the shaft 216. Rotation of the shaft 216 pivots the lever 220 to engage and pivot operating lever 188 to retract the stop arms 174, 184 of the carriage indexing mechanism. When this occurs, the carriage is tabulated 0.1 inch to the columnar position where the erroneous amount was first entered in the accumulators 22. As the carriage advances 0.1 inch toward the above mentioned columnar position, the cam member 118 strikes the cam or pointed end 430 of the slide 426 and pivots arm 418 away from the stop means 606. This releases the stop means 606 and thus allows the spring 578 to return the stop member 606 to its normal position, as shown in full lines in FIG. 22. In returning the stop means 606 to its normal position, the links 576 and 596 are, of course, moved by the spring 578 from the positions shown in FIG. 25 to the positions shown in FIG. 18. At about the time that the stop member 606 is disengaged from the abutment edge 610 of arm 418 the cam 118 trips the latch arm 312 to stop carriage travel.

What is claimed is:

1. In a cyclically operable accounting machine, supporting means, a carriage mounted on said supporting means, power means operable to move said carriage in tabulation and return directions, a retractable stop member normally holding said carriage against movement in a columnar position, cyclically operable means operatively connected to said retractable stop member and operable to retract the latter to effect movement of the carriage in a return direction toward an adjacent columnar position, means actuated by movement of the carriage toward said columnar position to release said stop member to stop said carriage at said adjacent columnar position, said carriage in said adjacent columnar position representative of an arithmetical function, means defining a carriage position sensing station, an arithmetical function selector responsive to positions of said carriage and operatively connected to and actuated by said cyclically operable means, an element carried by said carriage and positioned, when said carriage is in said adjacent columnar position, a predetermined distance from said station in a carriage tabulation direction less than the distance between columnar positions of said carriage, said element representative of an arithmetical function opposite of said first-mentioned arithmetical function, a second stop member retracting means operable to retract said stop member to effect an additional return movement of said carriage, and means actuated by the additional return movement of said carriage to release said stop member to stop said carriage with said element at said sensing station.

2. In a cyclically operable accounting machine, supporting means, a carriage mounted on said supporting means, power means operable to move said carriage in tabulation and return directions, a retractable stop member normally holding said carriage against movement in a columnar position, cyclically operable means operatively connected to said retractable stop member and operable to retract the latter to effect movement of the carriage in a return direction toward an adjacent columnar position, means actuated by movement of the carriage toward said columnar position to release said stop member to stop said carriage at said adjacent columnar position, said carriage in said adjacent columnar position representative of an arithmetical function, means defining a carriage position sensing station, an arithmetical function selector responsive to positions of said carriage and operatively connected to and actuated by said cyclically operable means, an element carried by said carriage and positioned a distance from said station, in a carriage tabulation direction, less than the distance between columnar positions of said carriage, when said carriage is in said adjacent columnar position, said element in said adjacent columnar position representative of an arithmetical function opposite of said first-mentioned arithmetical function, second means operable to retract said stop member to effect a further return movement of said carriage, a stop means operable to control operation of said cyclically operable means, said stop means operable to disable said cyclically operable means by and upon movement of said carriage, and a key operatively connected to said stop member and to said stop means and operable to effect movement of said carriage to said further return position and also move said stop means to enable said cyclically operable means irrespective of movement of said carriage to said further return position.

3. In a cyclically operable accounting machine as defined by claim 2, the inclusion of a latch member operable to latch said stop means in position to hold said cyclically operable means enabled and releasable by movement of said carriage in a tabulation direction to said adjacent columnar position.

4. In a cyclically operable accounting machine as defined by claim 2, the inclusion of a first latch member operable to latch said stop means in position to hold said cyclically operable means enabled, a first spring urging said stop means to latched position, a second spring exerting a greater force than said first spring and urging said first latch member to unlatched position, a second latch member operated by said key to overcome and hold said second spring ineffective, means actuated by said cyclically operable means to release said second latch member, and means actuated by movement of said carriage in a tabulation direction to said adjacent columnar position to release said first latch member.

References Cited by the Examiner
UNITED STATES PATENTS

| | | | |
|---|---|---|---|
| 2,298,202 | 10/1942 | Crosman | 235—60.47 |
| 2,597,162 | 5/1952 | Mehan et al. | 235—60.47 |
| 3,042,294 | 7/1962 | Pasinski et al. | 235—60.47 |
| 3,161,354 | 12/1964 | Christian et al. | 235—60.47 |

STEPHEN J. TOMSKY, *Primary Examiner.*

RICHARD B. WILKINSON, *Examiner.*

J. G. MURRAY, *Assistant Examiner.*